United States Patent
Damghanian et al.

(10) Patent No.: US 12,289,447 B2
(45) Date of Patent: Apr. 29, 2025

(54) PICTURE SEGMENT ORDERING

(71) Applicant: Telefonaktiebolaget LM Ericsson (publ), Stockholm (SE)

(72) Inventors: Mitra Damghanian, Upplands-Bro (SE); Rickard Sjöberg, Stockholm (SE); Martin Pettersson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 397 days.

(21) Appl. No.: 17/787,306

(22) PCT Filed: Dec. 3, 2020

(86) PCT No.: PCT/SE2020/051164
§ 371 (c)(1),
(2) Date: Jun. 18, 2022

(87) PCT Pub. No.: WO2021/126044
PCT Pub. Date: Jun. 24, 2021

(65) Prior Publication Data
US 2023/0024994 A1    Jan. 26, 2023

Related U.S. Application Data

(60) Provisional application No. 62/950,599, filed on Dec. 19, 2019.

(51) Int. Cl.
*H04N 19/119* (2014.01)
*H04N 19/172* (2014.01)
*H04N 19/70* (2014.01)

(52) U.S. Cl.
CPC ......... *H04N 19/119* (2014.11); *H04N 19/172* (2014.11); *H04N 19/70* (2014.11)

(58) Field of Classification Search
CPC .................................................. H04N 19/119
See application file for complete search history.

(56) References Cited

U.S. PATENT DOCUMENTS

| 2013/0039593 | A1* | 2/2013 | Komiya | G06T 9/008 382/233 |
| 2021/0044838 | A1* | 2/2021 | Chen | H04N 19/96 |
| 2022/0272335 | A1* | 8/2022 | Liu | H04N 19/174 |

OTHER PUBLICATIONS

Extended European Search Report, European Application No. 20900827.5, mailed Nov. 23, 2023, 12 pages.

(Continued)

*Primary Examiner* — Jerry T Jean Baptiste
(74) *Attorney, Agent, or Firm* — Sage Patent Group

(57) ABSTRACT

A method and decoder is provided for decoding at least one current picture from a bitstream. An indicator value is decoded from the bitstream specifying at least one rule of a plurality of rules, the at least one rule applied to ordering of segments coded in the bitstream, wherein the segments are segments in a segment partition layout. A set of syntax elements from the bitstream specifying a segment partition layout is decoded. A segment partition layout based on the set of syntax elements is derived. The at least one current picture in the bitstream is decoded using the segment partition layout, wherein the ordering of the segments complies with the at least one rule specified. An encoder and corresponding method define the segment partition layout, selects the at least one rule from a set of rules, and encodes the segment partition layout and the indicator value into the bitstream.

25 Claims, 11 Drawing Sheets

(56) References Cited

OTHER PUBLICATIONS

Miska M. Hannuksela, et al., "AHG12: Sub-Picture-Based Picture Partitioning and Decoding", 14th JVET Meeting, Mar. 19-27, 2019, JVET-N0046, 4 pages.
Benjamin Bross, et al., "Versatile Video Coding (Draft 7)", 16th JVET Meeting, Oct. 1-11, 2019, JVET-P2001-v9, 495 pages.
International Search Report and Written Opinion of the International Searching Authority, PCT/SE2020/051164, mailed Mar. 1, 2021, 14 pages.
Choi, B., et al., "AHG12: On sub-picture partitioning," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N0055, 6 Pages.
Choi, W., et al., "AHG12: On tile group configuration," Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0209, 3 pages.
Damghanian, M., et al., "AHG9: On Subpicture Ordering," Joint Video Experts Team (JVET) of ITU-T SG 16 WP 3 and ISO/IEC JTC 1/SC 29/WG 11, 17th Meeting: Brussels, BE, Jan. 7-17, 2020, JVET-Q0271, 4 pages.
Jang, H., et al., "AHG17/Non-CE5: on loop filter processing for subpicture treated as a picture," Joint Video Experts Team (JVET) of ITU-T SG 16 WP 3 and ISO/IEC JTC 1/SC 29/WG 11, 16th Meeting: Geneva, CH, Oct. 1-11, 2019, JVET-P0246, 7 pages.

\* cited by examiner

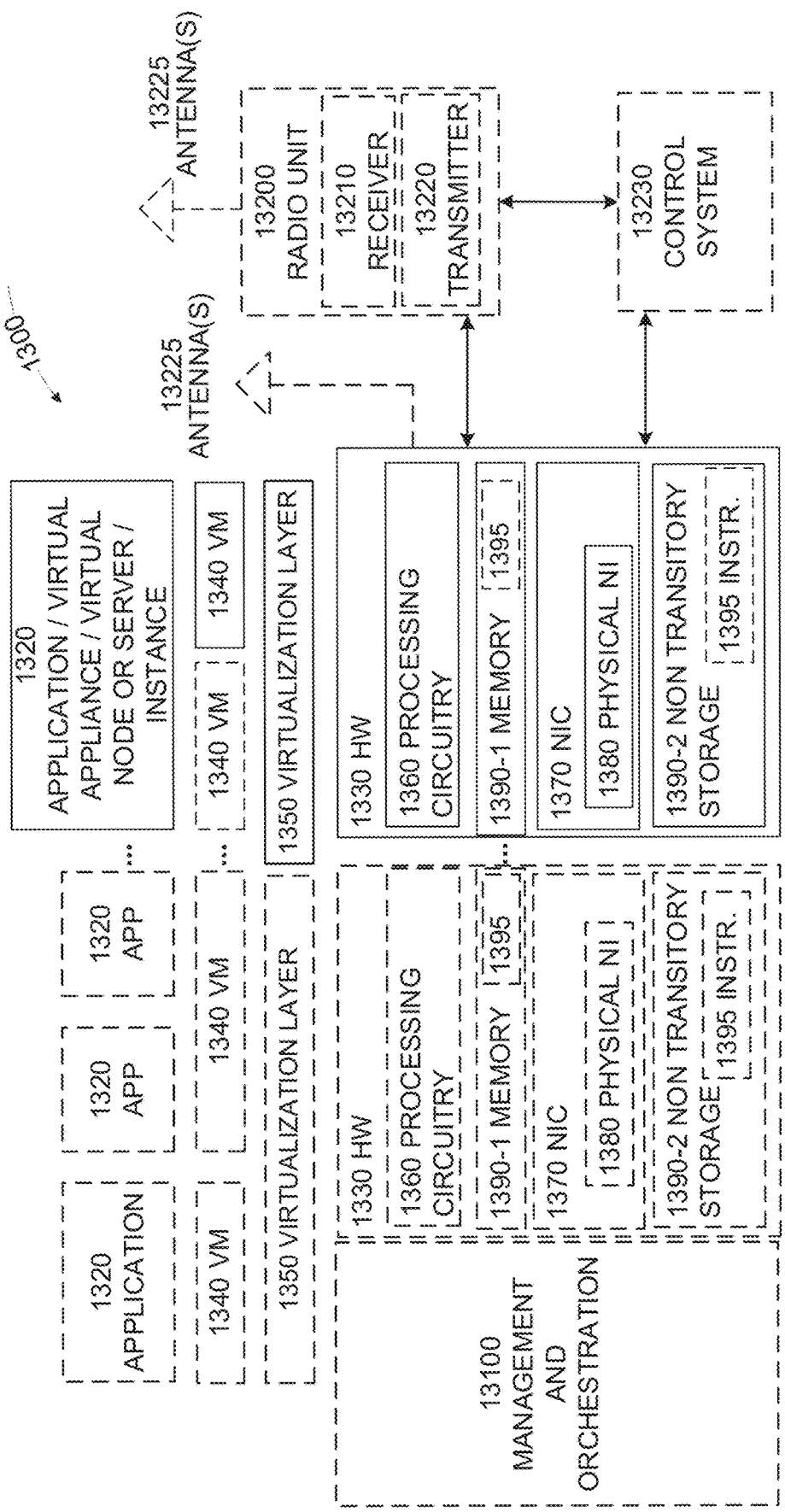

PICTURE SEGMENT ORDERING

CROSS REFERENCE TO RELATED APPLICATIONS

This application is a 35 U.S.C. § 371 national stage application of PCT International Application No. PCT/SE2020/051164 filed on Dec. 3, 2020, which in turn claims domestic priority to U.S. Provisional Patent Application No. 62/950,599, filed on Dec. 19, 2019, the disclosures and content of which are incorporated by reference herein in their entireties.

TECHNICAL FIELD

The present disclosure relates generally to methods and apparatuses for video encoding and decoding.

BACKGROUND

High Efficiency Video Coding (HEVC) is a block-based video codec standardized by ITU-T (International Telecommunication Union Telecommunication Standardization Sector) and MPEG (Moving Pictures Expert Group) that utilizes both temporal and spatial prediction. Spatial prediction is achieved using intra (I) prediction from within the current picture. Temporal prediction is achieved using uni-directional (P) or bi-directional (B) prediction on block level from previously decoded reference pictures. In the encoder, the difference between the original pixel data and the predicted pixel data, referred to as the residual, is transformed into the frequency domain, quantized and then entropy coded before transmitted together with necessary prediction parameters such as prediction mode and motion vectors, also entropy coded. The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VVC). The current version of the VVC draft specification, is found in JVET document JVET-P2001-vE.

Components

A video sequence consists of a series of pictures where each picture consists of one or more components. Each component can be described as a two-dimensional rectangular array of sample values. A picture in a video sequence typically consists of three components; one luma component Y where the sample values are luma values and two chroma components Cb and Cr, where the sample values are chroma values. The dimensions of the chroma components are often smaller than the luma components by a factor of two in each dimension to save bits in compression. For example, the size of the luma component of an HD picture would be 1920×1080 and the chroma components would each have the dimension of 960×540. Components are sometimes referred to as color components.

Blocks and Units

A block is one two-dimensional array of samples. In video coding, each component is split into blocks and the coded video bitstream consists of a series of coded blocks. It is common in video coding that the picture is split into units that cover a specific area of the picture. Each unit consists of all blocks from all components that make up that specific area and each block belongs fully to one unit. The macroblock in H.264 and the coding unit (CU) in HEVC are examples of units.

A block can alternatively be defined as a two-dimensional array in which a transform used in coding is applied to the two-dimensional array. These blocks are called "transform blocks". Alternatively, a block can be defined as a two-dimensional array in which a single prediction mode is applied to the two-dimensional array. These blocks can be called "prediction blocks". In this application, the word block is not tied to either of these definitions but that the descriptions herein can apply to either definition.

NAL Units

Both HEVC and VVC define a Network Abstraction Layer (NAL). All the data, i.e. both Video Coding Layer (VCL) or non-VCL data in HEVC and VVC is encapsulated in NAL units. A VCL NAL unit contains data that represents picture sample values. A non-VCL NAL unit contains additional associated data such as parameter sets and supplemental enhancement information (SEI) messages.

Parameter Sets

HEVC and VVC specify three types of parameter sets: the picture parameter set (PPS), the sequence parameter set (SPS) and the video parameter set (VPS). The PPS contains data that is common for one or more pictures, the SPS contains data that is common for a coded video sequence (CVS) and the VPS contains data that is common for multiple CVSs. In order to provide random-access points in a bitstream, it is common to periodically encode pictures as IRAP or GDR pictures where each such picture is preceded by the parameter sets necessary for decoding (VPS, SPS, PPS).

The current version of VVC also specifies two additional parameter sets, the adaptation parameter set (APS) and the decoder parameter set (DPS).

The APS carries parameters needed for the adaptive loop filter (ALF) tool and the luma mapping and chroma scaling (LMCS) tool.

The DPS contains information that may not change during the decoding session and may be good for the decoder to know about, e.g. the maximum number of allowed sublayers. The information in the DPS is not necessary for operation of the decoding process.

Tiles

The draft VVC video coding standard uses tiles where the tiles "divide" a picture into rectangular spatially independent regions. Tiles in the draft VVC coding standard are similar to the tiles used in HEVC. Using tiles, a picture in HEVC can be partitioned into rows and columns of samples where a tile is an intersection of a row and a column. FIG. 1 shows an example of a tile partitioning using 4 tile rows and 5 tile columns resulting in a total of 20 tiles for the picture.

The tile structure is signaled in the picture parameter set (PPS) by specifying the heights of the rows and the widths of the columns as shown in Table 1. Individual rows and columns can have different sizes, but the partitioning always spans across the entire picture, from left to right and top to bottom respectively. There is no decoding dependency between tiles of the same picture. This includes intra prediction, context selection for entropy coding and motion vector prediction. One exception is that in-loop filtering dependencies are allowed between tiles.

TABLE 1

Tile structure syntax in the PPS as in the current
version of the VVC draft specification.

| | Descriptor |
|---|---|
| pic_parameter_set_rbsp( ) { | |
| ... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     ... | |
|   } | |
|   ... | u(1) |
| } | |

The semantics for the syntax elements in Table 1 from the current version of the VVC draft specification are provided below:

no_pic_partition_flag equal to 1 specifies that no picture partitioning applied to each picture referring to the PPS. no_pic_partition_flag equal to 0 specifies each picture referring to the PPS may be partitioned into more than one tile or slice.

It is a requirement of bitstream conformance that the value of no_pic_partition_flag shall be the same for all PPSs that are referred to by coded pictures within a CLVS.

It is a requirement of bitstream conformance that the value of no_pic_partition_flag shall not be equal to 1 when the value of sps_num_subpics_minus1+1 is greater than 1.

pps_log 2_ctu_size_minus5 plus 5 specifies the luma coding tree block size of each CTU. pps_log2_ctu_size_minus5 shall be equal to sps_log 2_ctu_size_minus5.

num_exp_tile_columns_minus1 plus 1 specifies the number of explicitly provided tile column widths. The value of num_exp_tile_columns_minus1 shall be in the range of 0 to PicWidthInCtbsY−1, inclusive. When no_pic_partition_flag is equal to 1, the value of num_exp_tile_columns_minus1 is inferred to be equal to 0.

num_exp_tile_rows_minus1 plus 1 specifies the number of explicitly provided tile row heights. The value of num_exp_tile_rows_minus1 shall be in the range of 0 to PicHeightInCtbsY−1, inclusive. When no_pic_partition_flag is equal to 1, the value of num_tile_rows_minus1 is inferred to be equal to 0.

tile_column_width_minus1[i] plus 1 specifies the width of the i-th tile column in units of CTBs for i in the range of 0 to num_exp_tile_columns_minus1−1, inclusive. tile_column_width_minus1[num_exp_tile_columns_minus1] is used to derive the width of the tile columns with index greater than or equal to num_exp_tile_columns_minus1 as specified in clause. When not present, the value of tile_column_width_minus1[0] is inferred to be equal to PicWidthInCtbsY−1.

tile_row_height_minus1[i] plus 1 specifies the height of the i-th tile row in units of CTBs for i in the range of 0 to num_exp_tile_rows_minus1−1, inclusive. tile_row_height_minus1[num_exp_tile_rows_minus1] is used to derive the height of the tile rows with index greater than or equal to num_exp_tile_rows_minus1 as specified in clause. When not present, the value of tile_row_height_minus1[0] is inferred to be equal to PicHeightInCtbsY−1

Slices

The concept of slices in HEVC divides the picture into independently coded slices, where decoding of one slice in a picture is independent of other slices in the same picture. Different coding types could be used for slices of the same picture, i.e. a slice could either be an I-slice, P-slice or B-slice. One purpose of slices is to enable resynchronization in case of data loss.

In the current version of the VVC draft specification, a slice consists of either an integer number of complete tiles or an integer number of consecutive complete coding tree unit (CTU) rows within a tile of a picture. Each slice has a slice header comprising parameters that may be set for individual slices. Some parameters are restricted to be the same for all slices in a picture. Each slice in a CVS is carried in a separate VCL NAL unit.

In a previous version of the VVC draft specification, slices were referred to as tile groups. In the current version of the VVC draft specification, two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice. Table 2 shows the slice address syntax in the slice header in the current version of the VVC draft specification.

TABLE 2 slice addressing syntax in the slice header in the
current version of the WC draft specification

| | Descriptor |
|---|---|
| slice_header( ) { | |
|   ... | |
|   if( subpics_present_flag ) | |
|     slice_subpic_id | u(v) |
|   if( rect_slice_flag | | NumTilesInPic > 1 ) | |
|     slice_address | u(v) |
|   ... | |
| } | |

Semantics regarding Table 2 from the current version of the VVC draft specification are provided below:

slice_subpic_id specifies the subpicture identifier of the subpicture that contains the slice. If slice_subpic_id is present, the value of the variable SubPicIdx is derived to be such that SubpicIdList[SubPicIdx] is equal to slice_subpic_id. Otherwise (slice_subpic_id is not present), the variable SubPicIdx is derived to be equal to 0. The length of slice_subpic_id, in bits, is derived as follows:

If sps_subpic_id_signalling_present_flag is equal to 1, the length of slice_subpic_id is equal to sps_subpic_id_len_minus1+1.

Otherwise, if ph_subpic_id_signalling_present_flag is equal to 1, the length of slice_subpic_id is equal to ph_subpic_id_len_minus1+1.

Otherwise, if pps_subpic_id_signalling_present_flag is equal to 1, the length of slice_subpic_id is equal to pps_subpic_id_len_minus1+1.

Otherwise, the length of slice_subpic_id is equal to Ceil (Log 2 (sps_num_subpics_minus1+1)).

slice_address specifies the slice address of the slice. When not present, the value of slice_address is inferred to be equal to 0.
  If rect_slice_flag is equal to 0, the following applies:
  The slice address is the raster scan tile index.

entire top boundary consisting of a picture boundary or consisting of boundaries of previously decoded CTU(s). In the current version of the VVC draft specification, the partition layout of the rectangular slices is signaled in the PPS as described in Table 3.

TABLE 3

Syntax for the partition layout of rectangular slices in the PPS in the current version of the VVC draft specification.

|  | Descriptor |
|---|---|
| pic_parameter_set_rbsp( ) { | |
| ... | |
|   no_pic_partition_flag | u(1) |
|   if( !no_pic_partition_flag ) { | |
|     ... | |
|     rect_slice_flag | u(1) |
|     if( rect_slice_flag) | |
|       single_slice_per_subpic_flag | u(1) |
|     if( rect_slice_flag && ! single_slice_per_subpic_flag) { | |
|       num_slices_in_pic_minus1 | ue(v) |
|       tile_idx_delta_present_flag | u(1) |
|       for( i = 0; i < num_slices_in_pic_minus1; i++ ) { | |
|         slice_width_in_tiles_minus1[ i ] | ue(v) |
|         slice_height_in_tiles_minus1[ i ] | ue(v) |
|         if( slice_width_in_tiles_minus1[ i ] = = 0 && | |
|           slice_height_in_tiles_minus1[ i ] = = 0 ) { | |
|           num_slices_in_tile_minus1[ i ] | ue(v) |
|           numSlicesInTileMinus1 = num_slices_in_tile_minus1[ i ] | |
|           for( j = 0; j < numSlicesInTileMinus1; j++ ) | |
|             slice_height_in_ctu_minus1[ i++ ] | ue(v) |
|         } | |
|         if( tile_idx_delta_present_flag && i < num_slices_in_pic_minus1 ) | |
|           tile_idx_delta[ i ] | se(v) |
|       } | |
|     } | |
|     ... | |
|   } | |
|   ... | u(1) |
| } | |

The length of slice_address is Ceil(Log 2 (NumTilesIn-Pic)) bits.
The value of slice_address shall be in the range of 0 to NumTilesInPic−1, inclusive.
Otherwise (rect_slice_flag is equal to 1), the following applies:
The slice address is the slice index of the slice within the SubPicIdx-th subpicture.
The length of slice_address is Ceil(Log 2(NumSlicesIn-Subpic[SubPicIdx])) bits.
The value of slice_address shall be in the range of 0 to NumSlicesInSubpic[SubPicIdx]−1, inclusive.
It is a requirement of bitstream conformance that the following constraints apply:
  If rect_slice_flag is equal to 0 or subpics_present_flag is equal to 0, the value of slice_address shall not be equal to the value of slice_address of any other coded slice NAL unit of the same coded picture.
  Otherwise, the pair of slice_subpic_id and slice_address values shall not be equal to the pair of slice_subpic_id and slice_address values of any other coded slice NAL unit of the same coded picture.
  When rect_slice_flag is equal to 0, the slices of a picture shall be in increasing order of their slice_address values.
The shapes of the slices of a picture shall be such that each CTU, when decoded, shall have its entire left boundary and Here are semantics for the syntax elements in Table 3 from the current version of the VVC draft specification:
  no_pic_partition_flag equal to 1 specifies that no picture partitioning applied to each picture referring to the PPS. no_pic_partition_flag equal to 0 specifies each picture referring to the PPS may be partitioned into more than one tile or slice.
    It is a requirement of bitstream conformance that the value of no_pic_partition_flag shall be the same for all PPSs that are referred to by coded pictures within a CLVS.
    It is a requirement of bitstream conformance that the value of no_pic_partition_flag shall not be equal to 1 when the value of sps_num_subpics_minus1+1 is greater than 1.
  rect_slice_flag equal to 0 specifies that tiles within each slice are in raster scan order and the slice information is not signalled in PPS. rect_slice_flag equal to 1 specifies that tiles within each slice cover a rectangular region of the picture and the slice information is signalled in the PPS. When not present, rect_slice_flag is inferred to be equal to 1. When subpics_present_flag is equal to 1, the value of rect_slice_flag shall be equal to 1.
    single_slice_per_subpic_flag equal to 1 specifies that each subpicture consists of one and only one rectangular slice. single_slice_per_subpic_flag equal to 0 specifies that each subpicture may consist one or more rectangular slices. When subpics_present_flag is equal to 0, single_slice_per_subpic_flag shall be equal to 0. When single_slice_per_ subpic_flag is equal to 1, num_slices_in_pic_minus1 is inferred to be equal to sps_num_subpics_minus1.

num_slices_in_pic_minus1 plus 1 specifies the number of rectangular slices in each picture referring to the PPS. The value of num_slices_in_pic_minus1 shall be in the range of 0 to MaxSlicesPerPicture−1, inclusive, where MaxSlicesPerPicture is specified in Annex. When no_pic_partition_flag is equal to 1, the value of num_slices_in_pic_minus1 is inferred to be equal to 0.

tile_idx_delta_present_flag equal to 0 specifies that tile_idx_delta_values are not present in the PPS and that all rectangular slices in pictures referring to the PPS are specified in raster order according to the process defined in clause. tile_idx_delta_present_flag equal to 1 specifies that tile_idx_delta values may be present in the PPS and that all rectangular slices in pictures referring to the PPS are specified in the order indicated by the values of tile_idx_delta.

slice_width_in_tiles_minus1[i] plus 1 specifies the width of the i-th rectangular slice in units of tile columns. The value of slice_width_in_tiles_minus1[i] shall be in the range of 0 to NumTileColumns−1, inclusive. When not present, the value of slice_width_in_tiles_minus1[i] is inferred as specified in clause.

slice_height_in_tiles_minus1[i] plus 1 specifies the height of the i-th rectangular slice in units of tile rows. The value of slice_height_in_tiles_minus1[i] shall be in the range of 0 to NumTileRows−1, inclusive. When not present, the value of slice_height_in_tiles_minus1[i] is inferred as specified in clause.

num_slices_in_tile_minus1[i] plus 1 specifies the number of slices in the current tile for the case where the i-th slice contains a subset of CTU rows from a single tile. The value of num_slices_in_tile_minus1[i] shall be in the range of 0 to RowHeight[tileY]−1, inclusive, where tileY is the tile row index containing the i-th slice. When not present, the value of num_slices_in_tile_minus1[i] is inferred to be equal to 0.

slice_height_in_ctu_minus1[i] plus 1 specifies the height of the i-th rectangular slice in units of CTU rows for the case where the i-th slice contains a subset of CTU rows from a single tile. The value of slice_height_in_ctu_minus1[i] shall be in the range of 0 to RowHeight[tileY]−1, inclusive, where tileY is the tile row index containing the i-th slice.

tile_idx_delta[i] specifies the difference in tile index between the i-th rectangular slice and the (i+1)-th rectangular slice. The value of tile_idx_delta[i] shall be in the range of—NumTilesInPic+1 to NumTilesInPic−1, inclusive. When not present, the value of tile_idx_delta[i] is inferred to be equal to 0. In all other cases, the value of tile_idx_delta[i] shall not be equal to 0.

Subpictures

Subpictures are supported in the current version of VVC. Subpictures are defined as a rectangular region of one or more slices within a picture, this means a subpicture contains one or more slices that collectively cover a rectangular region of a picture.

In the current version of the VVC draft specification JVET-P2001-vE, subpicture location and size are signaled in the SPS. Boundaries of a subpicture region may be treated as picture boundaries (excluding in-loop filtering operations) conditioned to a per-subpicture flag subpic_treated_as_pic_flag[i] in the SPS. Also loop-filtering on subpicture boundaries is conditioned to a per-subpicture flag_loop_filter_across_subpic_enabled_flag[i] in the SPS.

There is also a subpicture ID mapping mechanism signaled in the SPS for the subpictures which is gated by two flags sps_subpic_id_present_flag and sps_subpic_id_signalling_present_flag.

Table 4 shows the subpicture syntax in the SPS in the current version of VVC. In Table 4 variable i is the subpicture index and the syntax elements for subpicture position, size and other properties are signaled for each subpicture in the order of subpicture index. For instance, all the syntax elements with i equal to 0 specify position, size and other properties of a subpicture with subpicture index equal to 0.

TABLE 4

Subpicture syntax in the SPS in the current version of the WC draft specification

| | Descriptor |
|---|---|
| seq_parameter_set_rbsp( ) { | |
| ... | |
|   subpics_present_flag | u(1) |
|   if( subpics_present_flag) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   sps_subpic_id_present_flag | u(1) |
|   if( sps_subpics_id_present_flag ) { | |
|     sps_subpic_id_signalling_present_flag | u(1) |
|     if( sps_subpics_id_signalling_present_flag ) { | |
|       sps_subpic_id_len_minus1 | ue(v) |
|       for( i = 0; i <= sps_num_subpics_minus1; i++ ) | |
|         sps_subpic_id[ i ] | u(v) |
|     } | |
|   } | |
| ... | |
| } | |

Semantics regarding Table 4 from the current version of the VVC draft specification are:

subpics_present_flag equal to 1 specifies that subpicture parameters are present in in the SPS RBSP syntax. subpics_present_flag equal to 0 specifies that subpicture parameters are not present in the SPS RBSP syntax.

NOTE—When a bitstream is the result of a sub-bitstream extraction process and contains only a subset of the subpictures of the input bitstream to the sub-bitstream extraction process, it might be required to set the value of subpics_present_flag equal to 1 in the RBSP of the SPSs.

sps_num_subpics_minus1 plus 1 specifies the number of subpictures. sps_num_subpics_minus1 shall be in the range of 0 to 254. When not present, the value of sps_num_subpics_minus1 is inferred to be equal to 0.

subpic_ctu_top_left_x[i] specifies horizontal position of top left CTU of i-th subpicture in unit of CtbSizeY. The length of the syntax element is Ceil(Log 2(pic_width_max_in_luma_samples/CtbSizeY)) bits. When not present, the value of subpic_ctu_top_left_x[i] is inferred to be equal to 0.

subpic_ctu_top_left_y[i] specifies vertical position of top left CTU of i-th subpicture in unit of CtbSizeY. The length of the syntax element is Ceil(Log 2(pic_height_max_in_luma_samples/CtbSizeY)) bits. When not present, the value of subpic_ctu_top_left_y[i] is inferred to be equal to 0.

subpic_width_minus1[i] plus 1 specifies the width of the i-th subpicture in units of CtbSizeY. The length of the syntax element is Ceil(Log 2(pic_width_max_in_luma_samples/CtbSizeY)) bits. When not present, the value of subpic_width_minus1[i] is inferred to be equal to Ceil(pic_width_max_in_luma_samples/CtbSizeY)−1.

subpic_height_minus1[i] plus 1 specifies the height of the i-th subpicture in units of CtbSizeY. The length of the syntax element is Ceil(Log 2(pic_height_max_in_luma_samples/CtbSizeY)) bits. When not present, the value of subpic_height_minus1[i] is inferred to be equal to Ceil(pic_height_max_in_luma_samples/CtbSizeY)−1.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to 0.

loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to 1.

It is a requirement of bitstream conformance that the following constraints apply:

For any two subpictures subpicA and subpicB, when the subpicture index of subpicA is less than that of subpicB, any coded slice NAL unit of subPicA shall precede any coded slice NAL unit of subPicB in decoding order.

The shapes of the subpictures shall be such that each subpicture, when decoded, shall have its entire left boundary and entire top boundary consisting of picture boundaries or consisting of boundaries of previously decoded subpictures.

sps_subpic_id_present_flag equal to 1 specifies that subpicture ID mapping is present in the SPS. sps_subpic_id_present_flag equal to 0 specifies that subpicture ID mapping is not present in the SPS.

sps_subpic_id_signalling_present_flag equal to 1 specifies that subpicture ID mapping is signalled in the SPS. sps_subpic_id_signalling_present_flag equal to 0 specifies that subpicture ID mapping is not signalled in the SPS. When not present, the value of sps_subpic_id_signalling_present_flag is inferred to be equal to 0.

sps_subpic_id_len_minus1 plus 1 specifies the number of bits used to represent the syntax element sps_subpic_id[i]. The value of sps_subpic_id_len_minus1 shall be in the range of 0 to 15, inclusive.

sps_subpic_id[i] specifies that subpicture ID of the i-th subpicture. The length of the sps_subpic_id[i] syntax element is sps_subpic_id_len_minus1+1 bits. When not present, and when sps_subpic_id_present_flag equal to 0, the value of sps_subpic_id[i] is inferred to be equal to i, for each i in the range of 0 to sps_num_subpics_minus1, inclusive.

Availability rule in the current version of the VVC draft specification

The availability rule for subpictures in the current version of the VVC draft specification JVET-P2001-vE is stated in the semantics of loop_filter_across_subpic_enabled_flag[i] syntax element and repeated here:

It is a requirement of bitstream conformance that the following constraints apply:

For any two subpictures subpicA and subpicB, when the subpicture index of subpicA is less than that of subpicB, any coded slice NAL unit of subpicA shall precede any coded slice NAL unit of subpicB in decoding order.

The shapes of the subpictures shall be such that each subpicture, when decoded, shall have its entire left boundary and entire top boundary consisting of picture boundaries or consisting of boundaries of previously decoded subpictures.

From the above requirement, the availability rule for subpictures groups together the coded slice NAL units of each subpicture in every access unit in the bitstream and constraints the positioning of the coded slice NAL units of every subpictures in an access unit in increasing order of the subpicture index in a way that arbitrary indexes for the subpictures might not be allowed.

The availability rule for slices in the current version of the VVC draft specification JVET-P2001-vE is stated in the semantics of the slice_address syntax element and is repeated here:

It is a requirement of bitstream conformance that the following constraints apply:

The shapes of the slices of a picture shall be such that each CTU, when decoded, shall have its entire left boundary and entire top boundary consisting of a picture boundary or consisting of boundaries of previously decoded CTU(s).

SUMMARY OF THE INVENTION

The availability rule for slices constraints the positioning of the coded slice NAL units. In the current version of the VVC draft specification, the order of picture segments such as subpictures and rectangular slices are constrained. The current restrictions on the order of the subpictures (and similarly for rectangular slices) are not necessary or optimal for all applications and use cases e.g. when the contents of the picture segments are spatially independent, or when the optimal decoding order of the segments at the decoder side cannot be achieved within the current ordering restrictions. The current restricted ordering of the picture segments can be suboptimal for some use-cases e.g. for low latency applications.

Another problem with the ordering constraints in the current version of the VVC draft specification is that they potentially bring unnecessary complexity to processes such as bitstream merging. The additional complexity is that the bitstream merging process needs to handle the proper ordering of the coded segments in the bitstream even in examples where encoding/decoding of the content of a segment is not relying on the encoding/decoding of other segments in the picture.

Another problem with the current ordering constraint is that it is applied regardless whether the content of the picture segments is dependent or independent. If the picture segments are independent in the sense that there is no inter or intra prediction among them and there is no loop-filtering across the segment boundaries, the availability rule seems not to add any value but instead imposes a computational burden.

The proposed solution introduces the concept of enabling different ordering rules applied to the segments in the picture and using one or more syntax elements to specify which rules are applied. The ordering rules may be the availability rule for subpictures and slices in the current version of the VVC draft specification, arbitrary ordering, the ordering in the increasing order of the first CTU address in each segment, etc.

According to some embodiments of the present disclosure, a method for decoding at least one current picture from a bitstream is described. The method includes decoding an indicator value from the bitstream specifying at least one rule of a plurality of rules, the at least one rule applied to ordering of segments coded in the bitstream, wherein the segments are segments in a segment partition layout. The method also includes decoding a set of syntax elements from the bitstream specifying a segment partition layout. The method also includes deriving a segment partition layout based on the set of syntax elements. The method further includes decoding the at least one current picture in the bitstream using the segment partition layout, wherein the ordering of the segments complies with the at least one rule specified.

In accordance with some embodiments, a decoder for a communication network is described. The decoder comprises a processor and a memory coupled with the processor. The memory includes instructions that when executed by the processor cause the processor to perform operations that include decoding an indicator value from a bitstream, the indicator value specifying at least one rule of a plurality of rules, the at least one rule applied to ordering of segments coded in the bitstream. The segments are segments in a segment partition layout. The memory also includes instructions that when executed by the processor cause the processor to perform operations that include decoding a set of syntax elements from the bitstream specifying a segment partition layout. The memory also includes instructions that when executed by the processor cause the processor to perform operations that include deriving a segment partition layout based on the set of syntax elements. The memory further includes instructions that when executed by the processor cause the processor to perform operations that include decoding at least one current picture in the bitstream using the segment partition layout, wherein the ordering of the segments complies with the at least one rule specified.

In accordance with some embodiments of the present disclosure, a method for encoding at least one current picture to a bitstream is described. The method includes defining a segment partition layout for segments for the at least one current picture to be encoded in the bitstream. The method also includes selecting at least one rule from a set of rules for the ordering of the segments in the segment partition layout for the at least one current picture to be encoded in the bitstream. The method also includes encoding the segment partition layout for the at least one current picture into the bitstream. The method also includes encoding an indicator value into the bitstream, wherein the indicator value identifies the set of rules selected for the ordering of the segments in the segment partition layout for the at least one current picture. The method further includes encoding the at least one current picture into the bitstream using the segment partition layout.

According to some embodiments, an encoder for a communication network is described. The encoder comprises a processor and a memory coupled with the processor. The memory includes instructions that when executed by the processor cause the processor to perform operations that include defining a segment partition layout for segments for at least one current picture to be encoded in the bitstream. The memory also includes instructions that when executed by the processor cause the processor to perform operations that include selecting at least one rule from a set of rules for the ordering of the segments in the segment partition layout for the at least one current picture to be encoded in the bitstream. The memory also includes instructions that when executed by the processor cause the processor to perform operations that include encoding the segment partition layout for the at least one current picture into the bitstream. The memory also includes instructions that when executed by the processor cause the processor to perform operations that include encoding an indicator value into the bitstream, wherein the indicator value identifies the set of rules selected for the ordering of the segments in the segment partition layout for the at least one current picture. The memory further includes encoding the at least one current picture into the bitstream using the segment partition layout.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 13 is a block diagram of a virtualization environment in accordance with some embodiments of inventive concepts.

DETAILED DESCRIPTION

Figure 1:
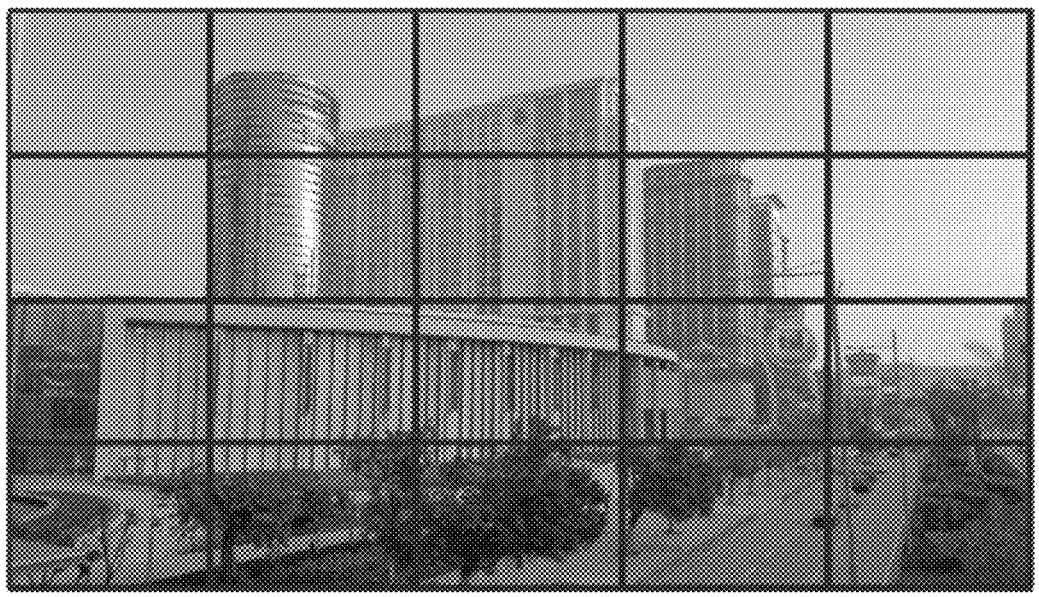
FIG. 1 is an example of tile partitioning according to a VVC coding standard as known in the art.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Availability rule in the current version of the VVC draft specification

The availability rule for subpictures in the current version of the VVC draft specification JVET-P2001-vE is stated in the semantics of loop_filter_across_subpic_enabled_flag[i] syntax element and repeated here:

It is a requirement of bitstream conformance that the following constraints apply:

For any two subpictures subpicA and subpicB, when the subpicture index of subpicA is less than that of subpicB, any coded slice NAL unit of subPicA shall precede any coded slice NAL unit of subPicB in decoding order.

The shapes of the subpictures shall be such that each subpicture, when decoded, shall have its entire left boundary and entire top boundary consisting of picture boundaries or consisting of boundaries of previously decoded subpictures.

From the above requirement, the availability rule for subpictures groups together the coded slice NAL units of each subpicture in every access unit in the bitstream and constraints the positioning of the coded slice NAL units of every subpictures in an access unit in increasing order of the subpicture index in a way that arbitrary indexes for the subpictures might not be allowed.

The availability rule for slices in the current version of the VVC draft specification JVET-P2001-vE is stated in the semantics of the slice_address syntax element and is repeated here:

It is a requirement of bitstream conformance that the following constraints apply:

The shapes of the slices of a picture shall be such that each CTU, when decoded, shall have its entire left boundary and entire top boundary consisting of a picture boundary or consisting of boundaries of previously decoded CTU(s).

From the above requirement, the availability rule for slices constraints the positioning of the coded slice NAL units. In the current version of the VVC draft specification, the order of picture segments such as subpictures and rectangular slices are constrained. For instance, the order of subpictures, specified by the subpicture index, in the bitstream is regulated by an availability rule specifying that each subpicture, when decoded, shall have its entire left boundary and entire top boundary consisting of picture boundaries or consisting of boundaries of previously decoded subpictures. The subpicture index will in turn determine the order of the VCL NAL unit groups corresponding to subpictures in the access units in the coded bitstream. The same applies for the order of rectangular slices within subpictures (or within the picture if the picture consists of a single subpicture) where the order of the rectangular slices is constrained by a similar availability rule.

However, the current restrictions on the order of the subpictures (and similarly for rectangular slices) are not necessary or optimal for all applications and use cases e.g. when the contents of the picture segments are spatially independent, or when the optimal decoding order of the segments at the decoder side cannot be achieved within the current ordering restrictions.

Figure 2:
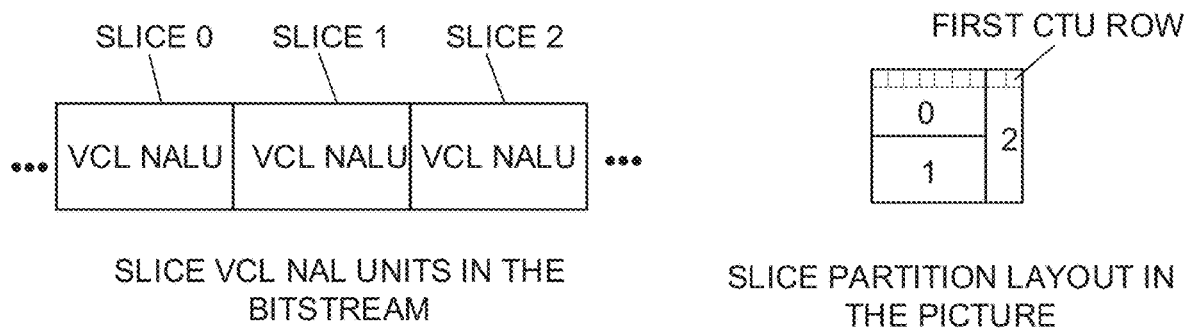
FIG. 2 is an example of a slice partition layout according to latency decoding as known in the art.

The current restricted ordering of the picture segments can be suboptimal for some use-cases e.g. for low latency applications. As an example shown in FIG. 2, a decoder decoding in raster scan order needs to wait for slice 2 in the bitstream for the illustrated rectangular slice partition layout within a picture, before being able to decode the first CTU row. The reason for this is that the segment order constraints do not allow slice 2 to precede slice 1 in the bitstream. This potentially increases latency and memory requirements which are critical in some applications, such as 360 video streaming. FIG. 2 also illustrates latency for decoding CTUs in raster scan order, caused by the order of slices in the slice partition layout which is the only allowed order in the current version of the VVC draft specification.

Another problem with the ordering constraints in the current version of the VVC draft specification is that they potentially bring unnecessary complexity to processes such as bitstream merging. The additional complexity is that the bitstream merging process needs to handle the proper ordering of the coded segments in the bitstream even in examples where encoding/decoding of the content of a segment is not relying on the encoding/decoding of other segments in the picture.

Another problem with the current ordering constraint is that it is applied regardless whether the content of the picture segments is dependent or independent. If the picture segments are independent in the sense that there is no inter or intra prediction among them and there is no loop-filtering across the segment boundaries, the availability rule seems not to add any value but instead imposes a computational burden.

The embodiments of inventive concepts described herein introduces the concept of enabling different ordering rules applied to the segments in the picture and using one or more syntax elements to specify which rules are applied. The ordering rules may be the availability rule for subpictures and slices in the current version of the VVC draft specification, arbitrary ordering, the ordering in the increasing order of the first CTU address in each segment, etc.

In one embodiment of inventive concepts, some of the problems above may be solved or reduced by relaxing the availability rule and allowing arbitrary order of the picture segments in the bitstream conditioned to the segments being independent which means inter and intra prediction between the segments and loop filtering on the segment borders are disabled.

Figure 3:
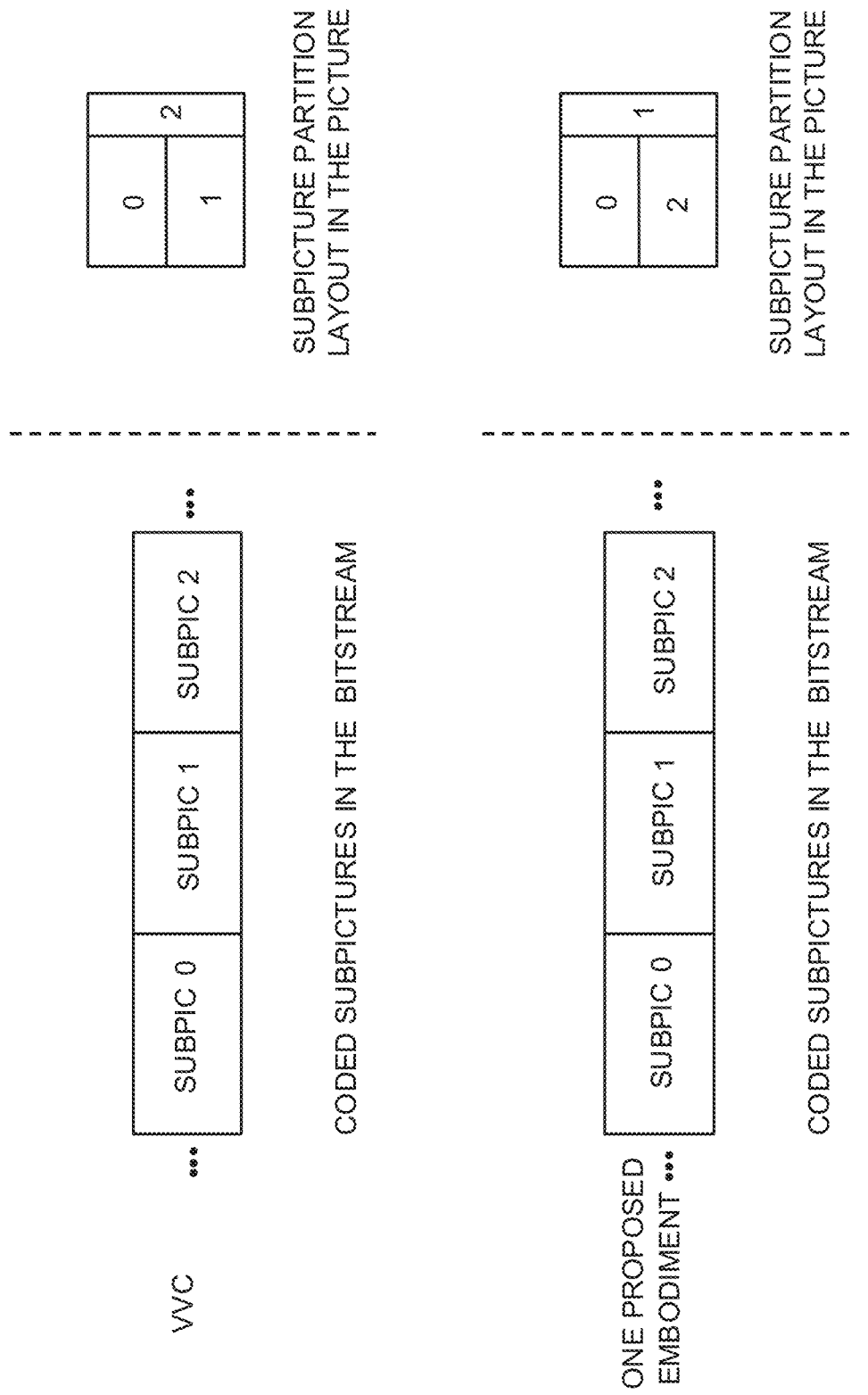
FIG. 3 is an example of a subpicture partition layout in a picture according to some embodiments of inventive concepts.

In another embodiment of inventive concepts, some of the problems above may be solved or reduced by allowing other preferred orders for the subpictures in the subpicture partition layout which are not currently allowed. As an example, the first row in FIG. 3 shows a subpicture partition layout and the only allowed subpicture ordering in the current version of the VVC draft specification. The second row in FIG. 3 shows example of a subpicture ordering in the proposed solution which is not allowed by the current version of the VVC draft specification. Numberings 0, 1 and 2 in FIG. 3 show subpicture indexes which are the same as the subpicture order in the bitstream. FIG. 3 also illustrates a Subpicture partition layout and ordering in the current version of the VVC draft specification (first row) and in one embodiment of the proposed solution (second row).

In another embodiment of inventive concepts, the arbitrary order of the coded segments in the bitstream is allowed if the segments are independent which means inter and intra prediction between the segments and loop filtering on the segment borders are disabled. This simplifies the bitstream merging process and content swapping between same size segments in the bitstream.

Some embodiments of inventive concepts can be applied to picture segments with a particular order in their partition layout such as subpictures and slices. Allowing different ordering rules for the segments is beneficial for various applications where some are listed in the following examples. One advantage of allowing arbitrary ordering of subpictures is that it simplifies processes such as merging of two or more bitstreams each including subpictures, since it removes the need for modifying the order of the coded subpictures in the output bitstream to comply with a particular order.

Figure 4:
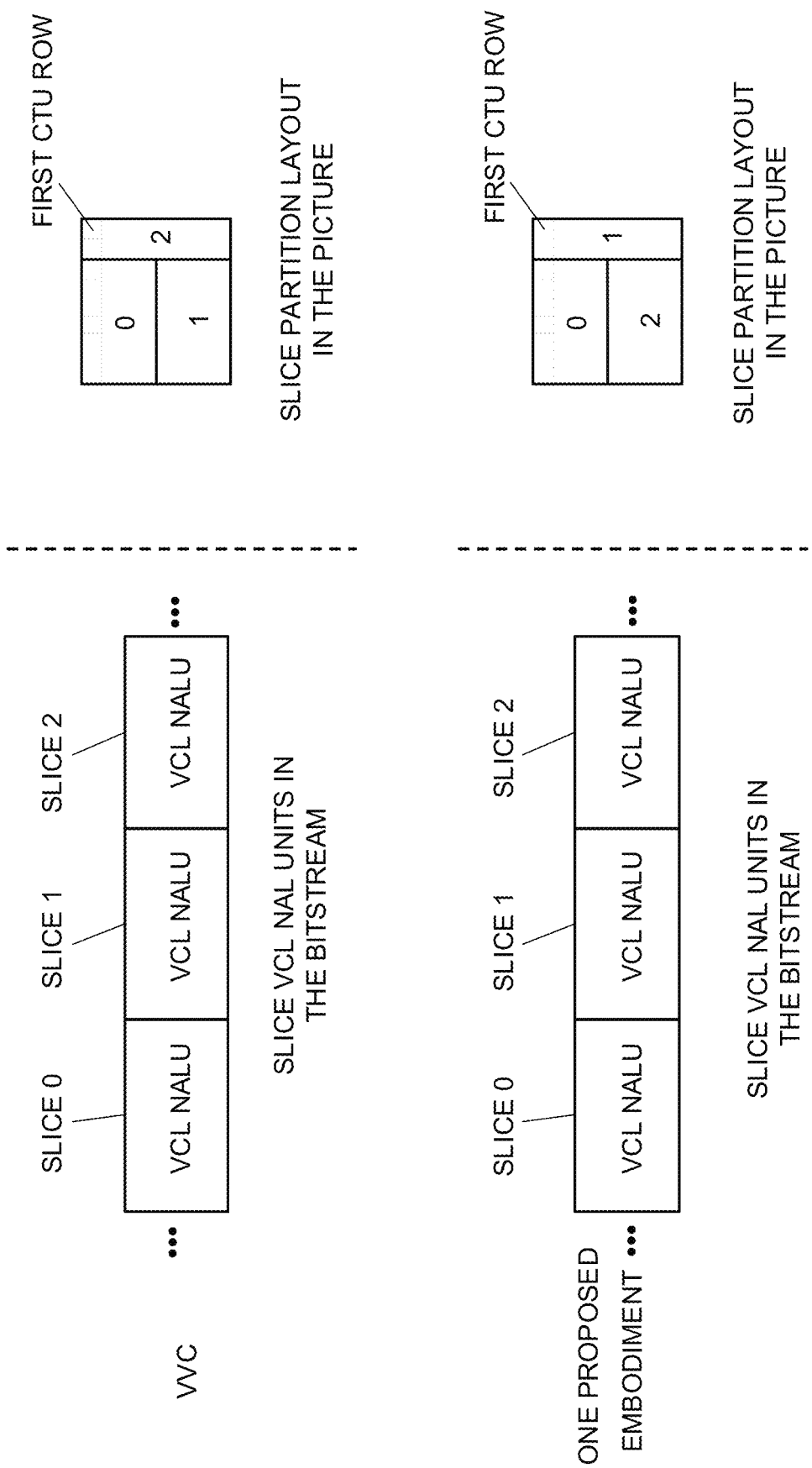
FIG. 4 is an example of a slice partition layout in a picture according to some embodiments of inventive concepts.

One advantage of allowing slices to be in increasing order of their first CTU addresses is that the latency may be reduced for decoders decoding in raster scan order. FIG. 4 illustrates an example where the latency for decoding CTUs in raster scan order using current version of the VVC draft specification (first row in FIG. 4) is reduced by allowing slices in increasing order of the first CTU address in the slice as expressed in one of the embodiments of the proposed solution (second row in FIG. 4). FIG. 4 also illustrates latency for decoding CTUs in raster scan order (first row) is improved by one of the embodiments of the proposed solution (second row).

Figure 5:
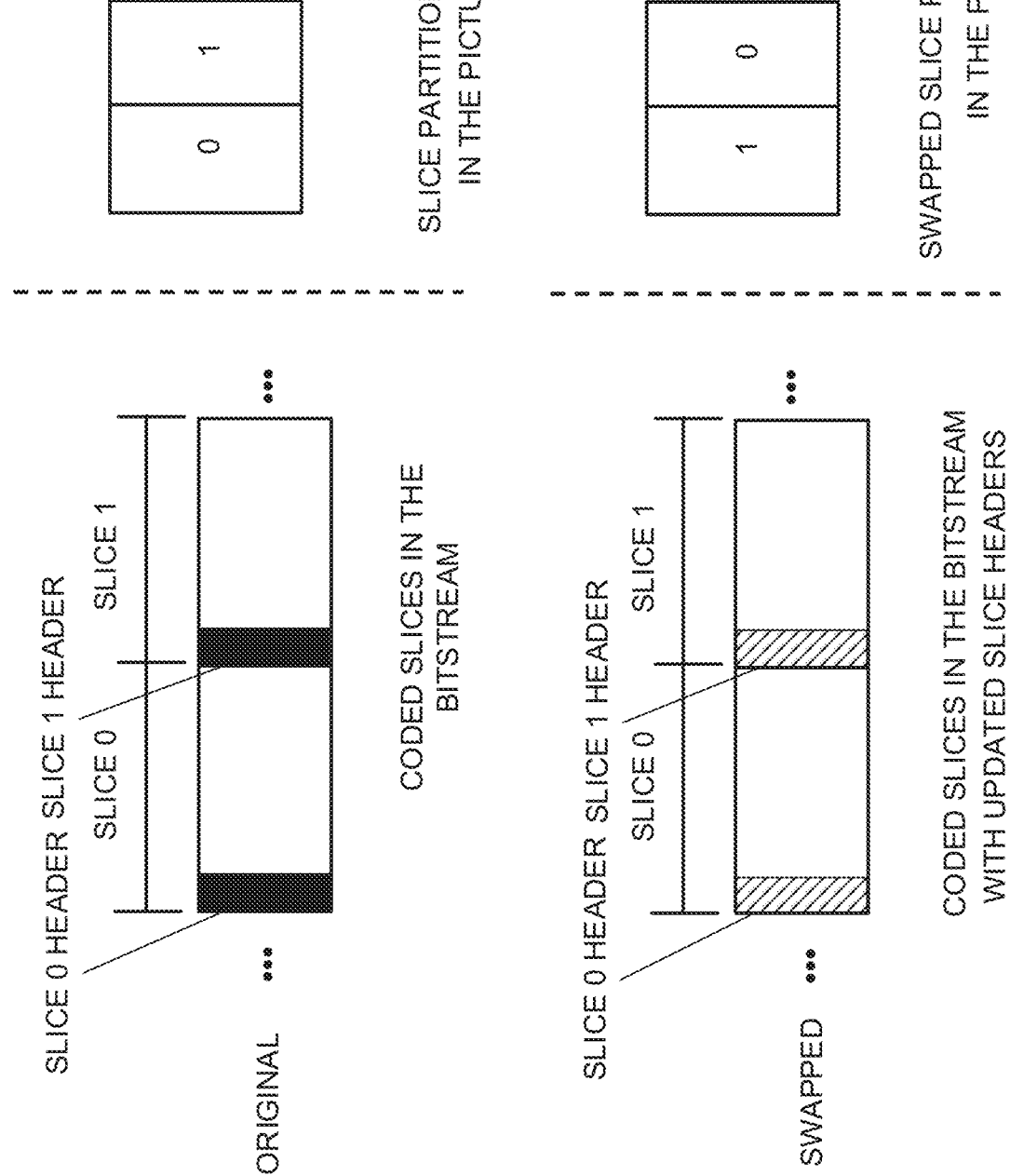
FIG. 5 is an example of a swapped slice partition layout in a picture according to some embodiments of inventive concepts.

Another advantage of some embodiments of inventive concepts is simplifying swapping of the slice contents. For instance, as illustrated in FIG. 5, two rectangular slices in the original picture can be swapped, using one of the proposed embodiments, without the need to check the availability rule for the new arrangement of the slices or changing the order of the slices in the bitstream, but only with updating the slice headers for the new slice addresses as illustrated in the second row of FIG. 5. The first row in FIG. 5 shows the original bit stream and slice partition layout and the second line in FIG. 5 illustrates the new bitstream and the swapped slice partition layout. This new bitstream is not a bitstream conforming to the current version of the VVC draft specification due to the availability rules in the VVC draft. FIG. 5 also illustrates swapping the content of two slices in an embodiment of the proposed solution.

Figure 6:
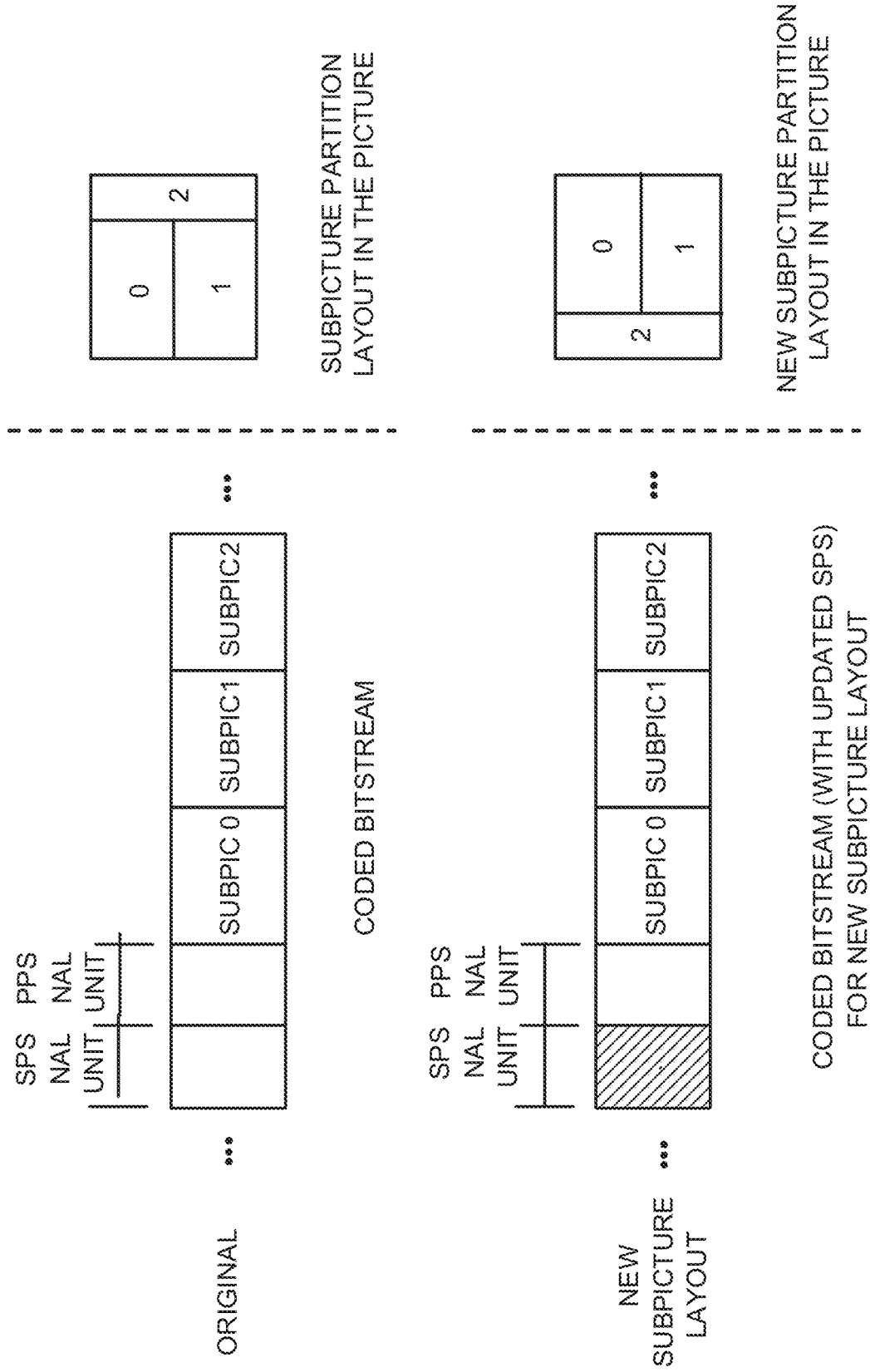
FIG. 6 is an example of changing a subpicture partition layout in a picture according to some embodiments of inventive concepts.

Arbitrary segment ordering for independent subpictures also allows rearranging the subpicture partition layout in the picture by updating the subpicture partition layout signaling in the SPS without changing any bits in the VCL. FIG. 6 shows rearranging the subpicture partition layout in the picture using one embodiment of the proposed solution. The first row in FIG. 6 shows the original bitstream and decoded picture with the original subpicture partition layout and the second row in FIG. 6 shows the bitstream with modified signaling of the partition layout in the SPS for the new subpicture partition layout. As shown in the first and second row of FIG. 6, the order of the coded subpictures in the bitstream does not need to be changed as the availability rule is waved. Note that the partition layout shown in the second row is not allowed in the current VVC draft due to the availability rules. FIG. 6 also shows changing the subpicture partition layout in an embodiment of the proposed solution.

The embodiments of inventive concepts introduce the concept of using an indicator to specify the rule or rules applied to the ordering of the segments in a segment partition layout of one or more pictures in a video sequence. The rule or rules applied to the ordering of the segments in a segment partition layout are called ordering rule or ordering constraint here after. The ordering rule regulates the index of the picture segments in the segment partition layout and/or the ordering of the coded segments in the bitstream.

A segment is a portion of a picture and a segment may be equivalent to a tile, a tile-group, a slice, a rectangular slice or a subpicture. The terms segment and picture segment are used interchangeably in this description. In the proposed solution, one or more syntax elements may be used to specify the rule or rules for ordering the picture segments in a segment partition layout. The rules for ordering the picture segments may affect the process for determining the position of the segments in the picture. The terms "constraint" and "rule" have been used interchangeably. The term "arbitrary ordering" is equal to "unconstrained ordering" and both are considered as an ordering rule. The embodiments described here are not limiting the invention. The embodiments described here may be combined.

The following description presents various embodiments of inventive concepts. These embodiments are presented as teaching examples and are not to be construed as limiting the scope of the inventive concepts. For example, certain details of the described inventive concepts may be modified, omitted, or expanded upon without departing from the scope of the described subject matter.

Figure 7:
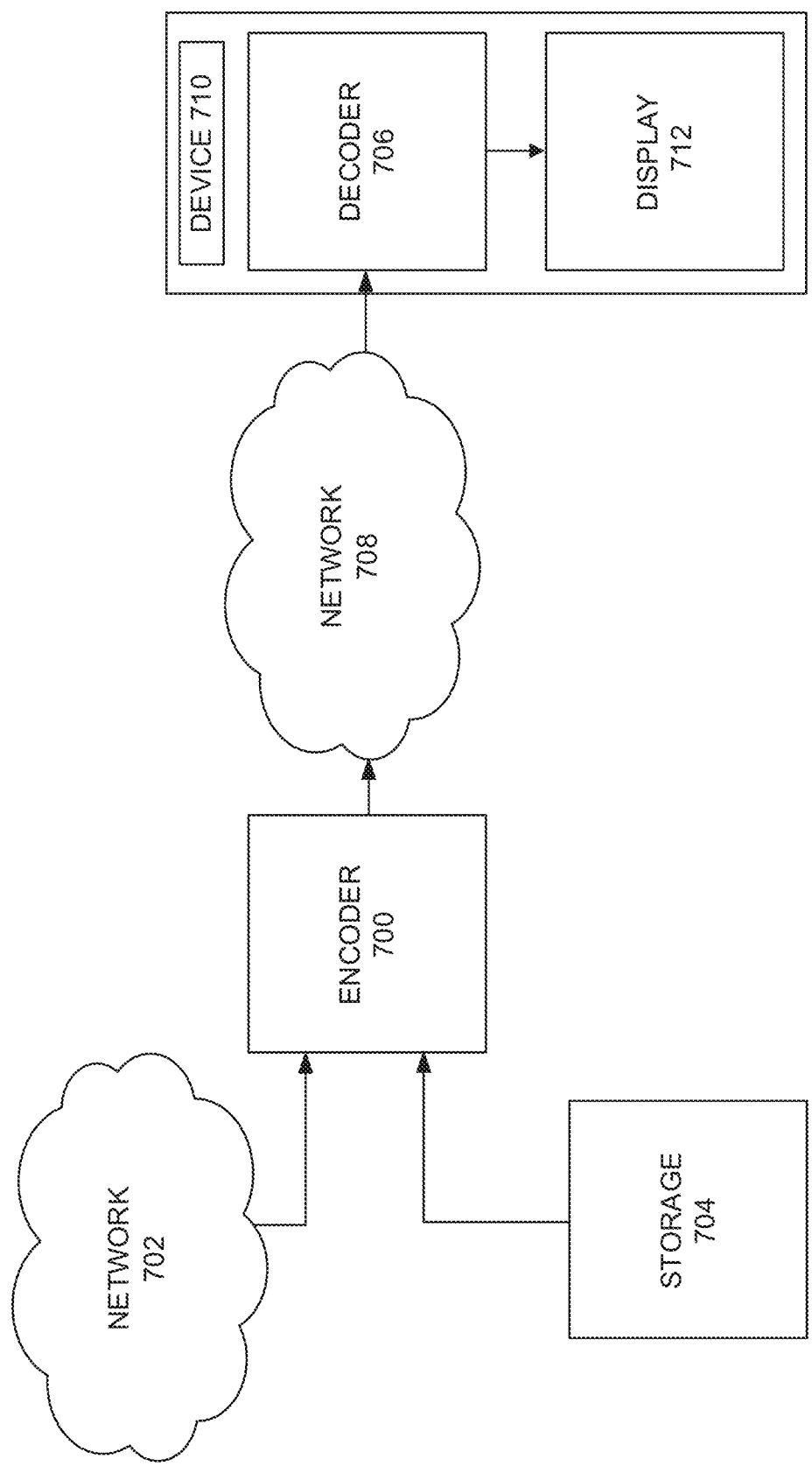
FIG. 7 is a block diagram of a system comprising an encoder and a decoder according to some embodiments of inventive concepts.

FIG. 7 illustrates an example of an operating environment of an encoder 700 that may be used to encode bitstreams as described herein. The encoder 700 receives media from network 702 and/or from storage 704 and encodes the media into bitstreams as described below and transmits the encoded media to decoder 706 via network 708. Storage device 704 may be part of a storage depository of videos such as a storage repository of a store or a streaming video service, a separate storage component, a component of a mobile device, etc. The decoder 706 may be part of a device 710 having a display 712. The device 710 may be a mobile device, a set-top device, a head-mounted display, and the like.

Figure 8:
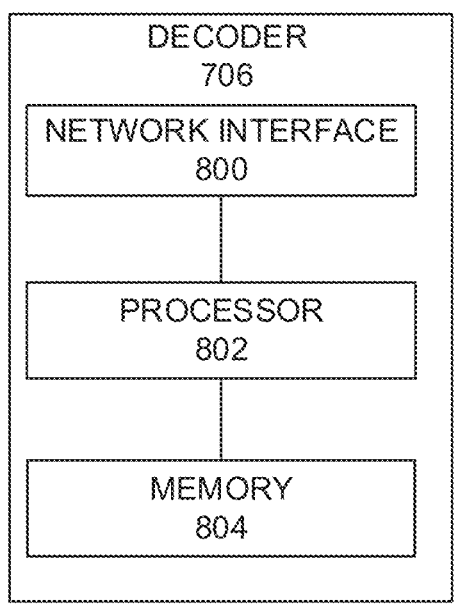
FIG. 8 is a block diagram of a decoder according to some embodiments of inventive concepts.

FIG. 8 is a block diagram illustrating elements of decoder 706 configured to decode video frames according to some embodiments of inventive concepts. As shown, decoder 706 may include a network interface circuit 800 (also referred to as a network interface) configured to provide communications with other devices/entities/functions/etc. The decoder 706 may also include processor circuitry 802 (also referred to as a processor) coupled to the network interface circuit 800, and a memory circuit 804 (also referred to as memory) coupled to the processor circuit. The memory circuitry 804 may include computer readable program code that when executed by the processor circuitry 802 causes the processor circuit to perform operations according to embodiments disclosed herein.

According to other embodiments, processor circuitry 802 may be defined to include memory so that a separate memory circuit is not required. As discussed herein, operations of the decoder 706 may be performed by processor 802 and/or network interface 800. For example, processor 802 may control network interface 800 to receive communications from encoder 700. Moreover, modules may be stored in memory 804, and these modules may provide instructions so that when instructions of a module are executed by processor 802, processor 802 performs respective operations.

Figure 9:
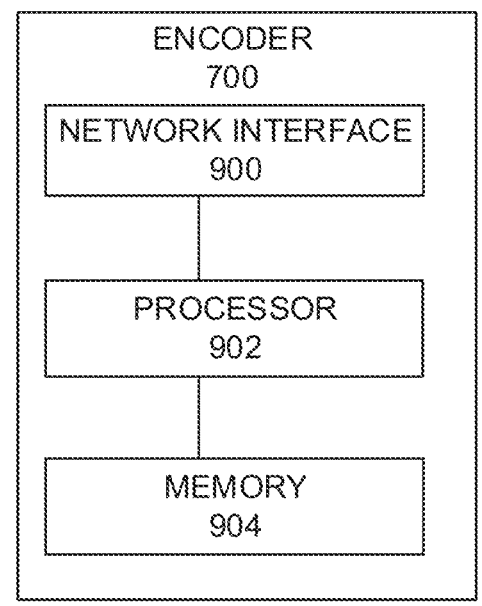
FIG. 9 is a block diagram of an encoder according to some embodiments of inventive concepts.

FIG. 9 is a block diagram illustrating elements of encoder 700 configured to encode video frames according to some embodiments of inventive concepts. As shown, encoder 700 may include network interface circuitry 900 (also referred to as a network interface) configured to provide communications with other devices/entities/functions/etc. The encoder 300 may also include processor circuitry 902 (also referred to as a processor) coupled to the network interface circuitry 900, and a memory circuitry 904 (also referred to as memory) coupled to the processor circuit. The memory circuitry 904 may include computer readable program code that when executed by the processor circuitry 902 causes the processor circuit to perform operations according to embodiments disclosed herein.

According to other embodiments, processor circuitry 902 may be defined to include memory so that a separate memory circuit is not required. As discussed herein, operations of the encoder 700 may be performed by processor 902 and/or network interface 900. For example, processor 902 may control network interface 902 to transmit communications to decoder 706 and/or to receive communications through network interface 900 from one or more other network nodes/entities/servers such as other encoder nodes, depository servers, etc. Moreover, modules may be stored in memory 904, and these modules may provide instructions so that when instructions of a module are executed by processor 902, processor 902 performs respective operations.

Embodiment 1—Which Ordering Rule

In a first embodiment of inventive concepts, a syntax element in the bitstream specifies the ordering rule applied to the segments in the bitstream. Example of the ordering rules are the availability rule, the arbitrary ordering defined in the second embodiment, the ordering in the increasing order of the first CTU address in each segment, etc. The ordering rules may allow only one or more than one possible ordering and may describe what orderings are allowed or what orderings are not allowed.

In one example, if the syntax element is equal to a first value then the availability rule is applied for the order of the segments in the bitstream, and if the signaled syntax element is equal to a second value then the order of the segments must be in increasing order of the top left CTU address of each segment. In a variant of this embodiment, one value of the syntax element specifies a fixed (default or signaled) ordering of the segments and another value of the syntax element specifies a specific ordering rule (such as an availability rule) for ordering of the segments. In another variant of this embodiment, there are more than two possible ordering rules and the value of the syntax element specify which ordering rule is applied to the segments in the segment partition layout.

A decoder may perform all or a subset of the following steps for this embodiment:
1. Decode an indicator value from the bitstream specifying a set of rules applied to the ordering of the segments in a segment partition layout.
2. Decode a set of syntax elements from the bitstream specifying a segment partition layout.
3. Derive a segment partition layout based on the set of syntax elements and the set of rules.
4. Decode at least one picture in the bitstream using the segment partition layout.

An encoder may perform all or a subset of the following steps for this embodiment:
1. Define a segment partition layout for the segments for at least one picture to be encoded in the bitstream.
2. Select a set of rules for the ordering of the segments in the segment partition layout for the at least one picture to be encoded in the bitstream.
3. Encode the segment partition layout for the at least one picture into the bitstream.
4. Encode an indicator value into the bitstream, wherein the indicator value identifies the set of rules for the ordering of the segments in the segment partition layout for the at least one picture.
5. Encode the at least one picture into the bitstream using the segment partition layout.

Encoder steps 1 and 2 may be performed in any order. Encoder steps 3 and 4 may also be performed in any order.

Embodiment 2—Arbitrary Ordering of Independent Segments

In another embodiment of inventive concepts, one (or more) syntax element is present in the bitstream and one value of the syntax element indicates that arbitrary segment ordering in the segment partition layout is applied to at least a subset of the picture segments. In one example of this embodiment, a first value of the syntax element specifies that arbitrary segment ordering in the segment partition layout is applied to at least a subset of the picture segments and a second value of the syntax element specifies that each segment, when decoded, has its entire left boundary and entire top boundary consisting of picture boundaries or consisting of boundaries of previously decoded segments.

In one example of this embodiment, a first value of the syntax element specifies that at least one segment, when decoded, may have at least a part of its left boundary and/or a part of its top boundary consisting of boundaries of not-yet-decoded segments and a second value of the syntax element specifies that each segment, when decoded, has its entire left boundary and entire top boundary consisting of picture boundaries or consisting of boundaries of previously decoded segments. The syntax element may be a flag and it may be present in a parameter set e.g. SPS, PPS, DPS, VPS or alike, VUI, a picture header or a segment header or alike. The syntax element may be called arbitrary_segments_ordering_syntax element or independent_segments syntax element.

In an example of this embodiment an independent subpicture syntax element is present in the bitstream and a value of the independent subpicture syntax element equal to 0 indicates that all the subpictures in the bitstream follow the availability rule for subpictures and a value of the independent subpicture syntax element equal to 1 indicates that the subpictures in the bitstream may not follow the availability rule for the subpictures. In another variant of this embodiment, the independent_segments syntax element may be signaled for the sequence or the whole bitstream, e.g. be present in an SPS or a DPS. In yet another variant of this embodiment the independent segment syntax element is signaled per picture or set of pictures.

In yet another variant of this embodiment, the independent_segments syntax element also specifies if the segment boundaries are treated as picture boundaries in the decoding process meaning that if the independent_segments syntax element is equal to a first value, no intra prediction, no inter prediction and no loop filtering is allowed across the segment boundaries. Example syntax for this preferred embodiment on top of the current version of the VVC draft specification is shown in Table 5. Changes compared to the VVC draft are shown in bold.

TABLE 5

Exemplary syntax for this embodiment on top of the current version of the VVC draft specification with changes in bold.

| | Descriptor |
|---|---|
| seq_parameter_set_rbsp( ) { | |
| ... | |
| subpics_present_flag | u(1) |
| if( subpics_present_flag ) { | |
|   sps_num_subpics_minus1 | u(8) |

TABLE 5-continued

Exemplary syntax for this embodiment on top of the current version of the VVC draft specification with changes in bold.

| | Descriptor |
|---|---|
| sps_independent_subpics_flag | u(1) |
| for( i = 0; i <= sps_num_subpics_minus1; i++ ) | |
| { | |
|    subpic_ctu_top_left_x[ i ] | u(v) |
|    subpic_ctu_top_left_y[ i ] | u(v) |
|    subpic_width_minus1[ i ] | u(v) |
|    if( !sps_independent_subpics_flag) { | |
|      subpic_treated_as_pic_flag[ i ] | u(1) |
|      loop_filter_across_subpic_enabled_flag i ] | u(1) |
|    } | |
| } | |
| } | |
| ... | |
| } | |

Example semantics for this preferred embodiment on top of the current version of the VVC draft specification is shown below. Changes compared to the VVC draft are shown double underlined.

3. Definitions:

3.56 hypothetical stream scheduler (HSS): A hypothetical delivery mechanism used for checking the conformance of a bitstream or a decoder with regards to the timing and data flow of the input of a bitstream into the hypothetical reference decoder.

3.57 independent subpicture: a subpicture treated as a picture in the decoding process.

3.57 independent subpicture (alternative definition): a subpicture for which the subpicture boundaries are treated as picture boundaries in the decoding process 3.58 informative: A term used to refer to content provided in this Specification that does not establish any mandatory requirements for conformance to this Specification and thus is not considered an integral part of this Specification.

sps_independent_subpics_flag equal to 1 specifies that no intra prediction, no inter prediction and no in-loop filtering operations may be performed across any subpicture boundary in the CLVS. sps_independent_subpics_flag equal to 0 specifies that intra prediction, inter prediction or in-loop filtering operations across the subpicture boundaries in the CLVS may be allowed. When not present, the value of sps_independent_subpics_flag is inferred to be equal to 0.

subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to sps_independent_subpics_flag.

loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to !sps_independent_subpics_flag.

It is a requirement of bitstream conformance that the following constraints apply:

For any two subpictures subpicA and subpicB, when the subpicture index of subpicA is less than that of subpicB, any coded slice NAL unit of subPicA shall precede any coded slice NAL unit of subPicB in decoding order.

The order of subpictures shall be such that each subpicture, when decoded, shall have its entire left boundary and entire top boundary consisting of picture boundaries or consisting of boundaries of previously decoded subpictures or consisting of boundaries of independent subpictures.

Below is an alternative for the second constraint (changes compared to the VVC draft are shown double underlined):

When_sps_independent_subpics_flag is equal to 0, the shape order of subpictures shall be such that each subpicture, when decoded, shall have its entire left boundary and entire top boundary consisting of picture boundaries or consisting of boundaries of previously decoded subpictures.

A decoder may perform all or a subset of the following steps for this embodiment to decode a current picture from a bitstream:

1. Decode a first indicator value from the bitstream wherein the first indicator value is equal to a value that specifies that the current picture is segmented into multiple picture segments.
2. Decode a second indicator value from the bitstream wherein the second indicator value is equal to a value that specifies that all segments in the picture are independent, wherein all segments being independent means that no segment is depending on any property of any other segment for inter prediction, intra prediction or loop filtering. The presence of the second indicator may be conditioned on the first indicator value being equal to a value that specifies that the current picture is segmented into multiple picture segments.
3. Decode the current picture from the bitstream, wherein
   a. no segment in the current picture is depending on any property of any other segment for inter prediction, intra prediction or loop filtering and,
   b. the decoding order of the segments in the bitstream is such that at least one segment do not have its entire left boundary and entire top boundary consisting of picture boundaries or consisting of boundaries of previously decoded subpictures.

Step 3b is optional such that step 3b is present in one embodiment and not present in another embodiment. Alternatively, a decoder may perform all or a subset of the following steps for this embodiment to decode a current picture from a bitstream:

1. Decode a first indicator value from the bitstream wherein the first indicator value is equal to a value that specifies that the current picture is segmented into multiple picture segments.
2. Decode a second indicator value from the bitstream wherein the second indicator value is equal to a value that specifies that the segment boundaries in the picture are treated as picture boundaries in the decoding process of the picture. The presence of the second indicator may be conditioned on the first indicator value being equal to a value that specifies that the current picture is segmented into multiple picture segments.
3. Decode the current picture from the bitstream, wherein
   a. the segment boundaries in the picture are treated as picture boundaries and,
   b. the decoding order of the segments in the bitstream is such that at least one segment do not have its entire left boundary and entire top boundary consisting of picture boundaries or consisting of boundaries of previously decoded subpictures.

Step 3b is optional such that step 3b is present in one embodiment and not present in another embodiment.

An encoder may perform all or a subset of the following steps for this embodiment to encode a current picture into a bitstream:

1. Encode a first indicator value into the bitstream wherein the first indicator value is equal to a value that specifies that the current picture is segmented into multiple picture segments.
2. Encode a second indicator value into the bitstream wherein the second indicator value is equal to a value that specifies that the segment boundaries in the picture are treated as picture boundaries in the encoding process of the picture. The presence of the second indicator may be conditioned on the first indicator value being equal to a value that specifies that the current picture is segmented into multiple picture segments.
3. Encode the current picture into the bitstream, wherein
   a. the segment boundaries in the picture are treated as picture boundaries and,
   b. the order of the segments in the bitstream is such that at least one segment do not have its entire left boundary and entire top boundary consisting of picture boundaries or consisting of boundaries of preceding subpictures.

An alternative step 2 for the above encoding steps is below:

2. Encode a second indicator value into the bitstream wherein the second indicator value is equal to a value that specifies that all segments in the picture are independent, wherein all segments being independent means that no segment is depending on any property of any other segment for inter prediction, intra prediction or loop filtering. The presence of the second indicator may be conditioned on the first indicator value being equal to a value that specifies that the current picture is segmented into multiple picture segments.

Embodiment 3-Ordering Rule for a Subset of the Segments

In this embodiment of inventive concepts, one or more syntax elements specify the segment ordering rule which is applied to one or more subsets of the segments. The syntax element values may be general between subsets or particular to each subset.

One example for this embodiment is when the availability rule is applied to a subset of the segments defined as dependent segments, meaning segments where inter or intra prediction or loop filtering across their boundaries may exist, and the arbitrary segment ordering rule is applied to independent segments meaning the segments without any inter or intra prediction and loop filtering across their boundaries. Segment subsets may be created based on segment properties such as their spatial position in the picture, for instance the segment which includes the first CTU in the picture or the last CTU in the picture or the segments which are sharing boundary with the left picture boundary or other properties such as the segment size like segments containing number of CTUs smaller than a threshold.

One example for this embodiment is when the arbitrary ordering is applied to all segments except the segment that contains the first CTU in the picture.

Embodiment 4—Ordering Rule for a Subset of the Segments

In this embodiment of inventive concepts, a set of ordering rules are applied to level one segments while the same or another set of rules are applied to level two segments in each level one segment where each level one segment contains one or more level two segments. In one example, level one segments are subpictures and level two segments are slices. In one example where level one segments are subpictures and level two segments are slices, arbitrary ordering is applied to the subpictures while availability rule is applied to the slices in each subpicture.

Another example of this embodiment is when there are at least two subpictures each containing more than one rectangular slice and the order of the rectangular slices within subpictures follow the availability rule but the order of the subpictures in the picture does not follow the availability rule.

Embodiment 5—Ordering Rule for a Subset of the Segments

This embodiment of inventive concepts comprises extracting a coded segment A of a first picture from a first bitstream and extracting a coded segment B of a second picture from a second bitstream and write (merge) coded segment A and coded segment B into a third picture in a third bitstream in an order according to an ordering rule specified by one or more syntax elements, according to any of the previous embodiments, signaled in the third bitstream.

In one version of this embodiment the syntax element indicates that segments in the bitstream may have been merged from multiple bitstreams. A bitstream merger or stitcher may perform all or a subset of the following steps for this embodiment to merge two or more input bitstreams into one output bitstream:

1. Determine for each input bitstream that the segment boundaries in each input bitstream are treated as picture boundaries in the decoding process of each input bitstream.
2. Encode a first indicator value into the output bitstream wherein the first indicator value is equal to a value that specifies that the pictures in the output bitstream are (or will be) segmented into multiple picture segments.
3. Encode a second indicator value into the output bitstream wherein the second indicator value is equal to a value that specifies that the segment boundaries in the pictures in the output bitstream are (or will be) treated as picture boundaries in the decoding process of the pictures in the bitstream. The presence of the second indicator may be conditioned on the first indicator value being equal to a value that specifies that the pictures in the output bitstream are (or will be) segmented into multiple picture segments
4. Merge at least one coded segment from each of the input bitstreams to form a coded picture of the output bitstream, wherein
   a. the segment boundaries in the coded picture will be treated as picture boundaries when the coded picture is (later) decoded and,
   b. (optionally) the order of the segments in the coded picture is such that at least one segment do not have its entire left boundary and entire top boundary consisting of picture boundaries or consisting of boundaries of preceding segments.

5. Write or output the coded picture into the output bitstream.

Operations of a decoder 706 (implemented using the structure of the block diagram of FIG. 8) will now be discussed with reference to the flow chart of FIG. 10 according to some embodiments of inventive concepts. As discussed above, modules may be stored in memory 804 of FIG. 8, and these modules may provide instructions so that when the instructions of a module are executed by processing circuitry 802, processing circuitry 802 performs respective operations of the flow chart.

Figure 10:
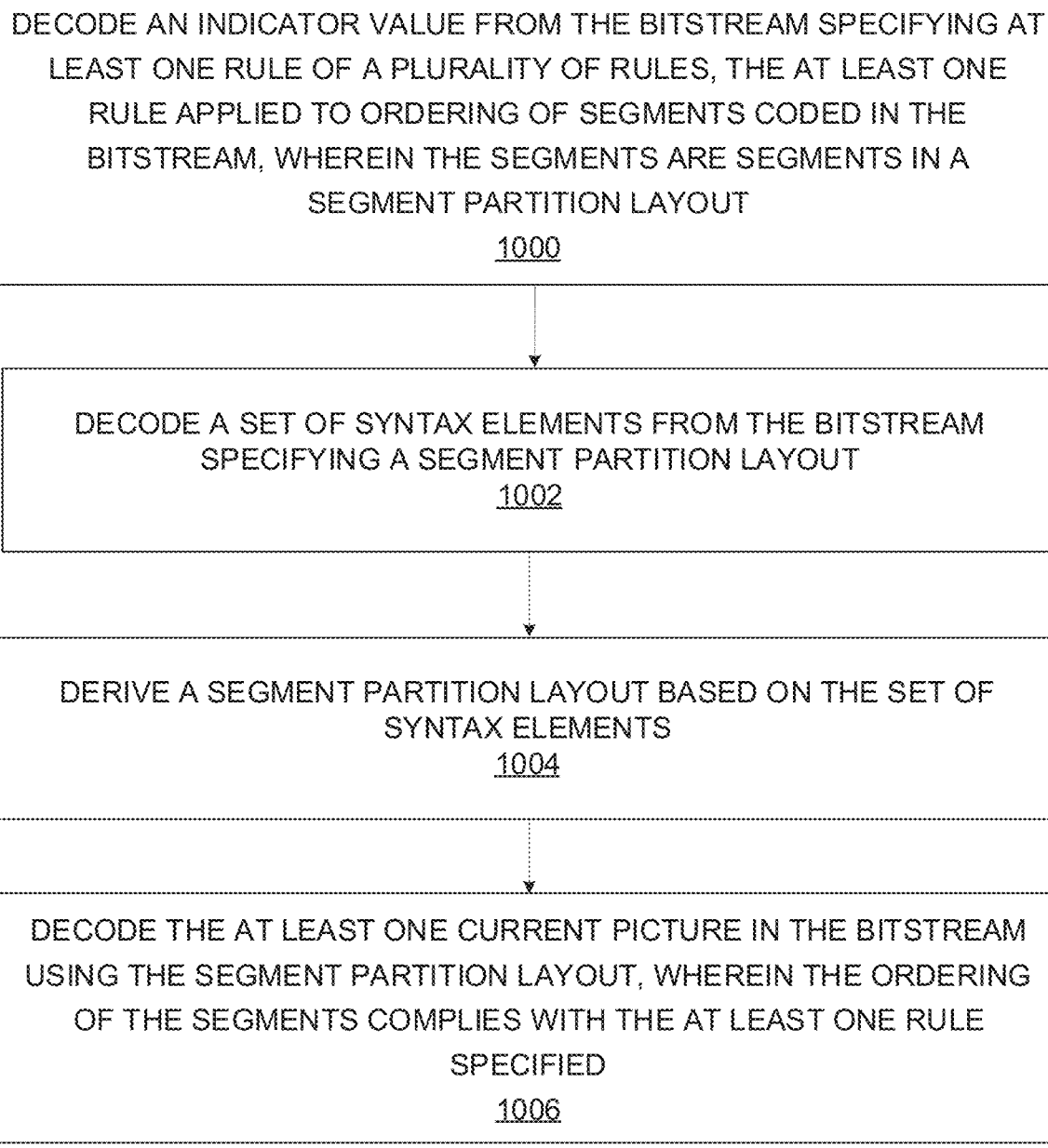
FIG. 10 is a flow chart illustrating operations of a decoder according to some embodiments of inventive concepts.

FIG. 10 illustrates a method for decoding at least one current picture from a bitstream in accordance with embodiments. The method may be performed by decoder 706 which may receive a bitstream from encoder 700 illustrated in FIG. 7. Returning to FIG. 10, the processing circuitry 802 in block 1000 may decode an indicator value from the bitstream specifying at least one rule of a plurality of rules, the at least one rule applied to ordering of segments coded in the bitstream, wherein the segments are segments in a segment partition layout. For example, decoder 706 may operate to decode an indicator value from the bitstream specifying at least one rule of a plurality of rules, the at least one rule applied to ordering of segments coded in the bitstream, wherein the segments are segments in a segment partition layout. In some embodiments, the plurality of rules comprises one or more of an availability rule, an arbitrary segment ordering, an ordering in an increasing order of a first coding tree unit address in each segment, an ordering rule based on the size or location of the segments in the segment layout, and a combination of two or more rules.

In block 1002, the processing circuitry 802 may decode a set of syntax elements from the bitstream specifying a segment partition layout. Continuing the previous example, decoder 706 may operate to decode a set of syntax elements from the bitstream specifying a segment partition layout. In block 1004, the processing circuitry 802 may derive a segment partition layout based on the set of syntax elements. The decoder 706 may operate to derive a segment partition layout based on the set of syntax elements. In some embodiments, the processing circuitry 802 may derive the segment partition layout based on the set of syntax elements and the at least one rule. The processing circuitry 802 may decode the indicator value from one or more syntax elements of the set of syntax elements. In another embodiment, the processing circuitry 802 may decode the indicator value from the bitstream by decoding the indicator value from one or more syntax elements of the set of syntax elements. In another embodiment, the processing circuitry 802 may decode the indicator value from the bitstream by decoding the indicator value from one or more syntax elements in a parameter set.

Returning to FIG. 10, the processing circuitry 802 in block 1006 may decode the at least one current picture in the bitstream using the segment partition layout, wherein the ordering of the segments complies with the at least one rule specified. Continuing the previous example, decoder 706 may operate to decode the at least one current picture in the bitstream using the segment partition layout, wherein the ordering of the segments complies with the at least one rule specified. In some embodiments, decoding the set of syntax elements may comprise decoding the indicator value from a syntax element of the set of syntax elements. In this embodiment, the processing circuitry 802 may determine that arbitrary segment ordering in the segment partition layout is applied to all segments of the at least one current picture responsive to the indicator value being a first value. For example, decoder 706 may operate to decode the indicator value from a syntax element of the set of syntax elements and determine that arbitrary segment ordering in the segment partition layout is applied to all segments of the at least one current picture responsive to the indicator value being a first value.

In some embodiments, responsive to the indicator value being a second value, each segment, when decoded has an entire left boundary and an entire top boundary consisting of picture boundaries or consisting of boundaries of previously decoded segments. In some other embodiments, responsive to the indicator value being a first value, a decoding order of the segments includes that at least one segment does not have an entire left boundary and an entire top boundary consisting of picture boundaries or consisting of boundaries of previously decoded segments.

The processing circuitry 802 may decode a value of a syntax element of the set of syntax elements. For example, decoder 706 may decode a value of a syntax element of the set of syntax elements. The processing circuitry 802 may determine that all segments in the bitstream follow an availability rule for segments responsive to the value being a first value. In this example, decoder 706 may determine that all segments in the bitstream follow an availability rule for segments responsive to the value being a first value. Alternatively, the processing circuitry 802 may determine that segments in the bitstream may not follow the availability rule for the segments responsive to the value being a second value. For example, decoder 706 may determine that segments in the bitstream may not follow the availability rule for the segments responsive to the value being a second value.

The processing circuitry 802 may decode a first indicator value from the bitstream wherein the first indicator value specifies whether the at least one current picture is segmented into a plurality of segments. The processing circuitry 802 may decode a second indicator value from the bitstream wherein the second indicator value specifies whether all segments in the at least one current picture are independent. For example, decoder 706 may decode a first indicator value from the bitstream wherein the first indicator value specifies whether the at least one current picture is segmented into a plurality of segments. The decoder 706 may also decode a second indicator value from the bitstream wherein the second indicator value specifies whether all segments in the at least one current picture are independent. In some other embodiments, the processing circuitry 802 may decode a second indicator value from the bitstream wherein the second indicator value specifies whether all segment boundaries in the at least one current picture are treated as picture boundaries in decoding of the at least one current picture. For example, decoder may decode a second indicator value from the bitstream wherein the second indicator value specifies whether all segment boundaries in the at least one current picture are treated as picture boundaries in decoding of the at least one current picture.

In some embodiments, the second indicator value and the indicator value are values of a same indicator. The first indicator may specify that the current picture is segmented into a plurality of segments. The second indicator value may specify that all segments in the current picture are independent. Alternatively, the second indicator value may specify that all segment boundaries in the current picture are treated as picture boundaries in decoding of the current picture. In this embodiment, the processing circuitry 802 may decode the current picture by decoding each segment wherein no segment in the current picture is depending on any property of any other segment in the current picture.

The processing circuitry 802 may decode a syntax element of the set of syntax elements and apply arbitrary ordering to all segments of the at least one current picture except a segment containing a first coding tree unit in the picture responsive to the syntax element specifying the arbitrary ordering. For example, decoder 706 may decode a syntax element of the set of syntax elements and apply arbitrary ordering to all segments of the at least one current picture except a segment containing a first coding tree unit in the picture responsive to the syntax element specifying the arbitrary ordering. In some embodiments, the at least one current picture has a plurality of segments in a plurality of levels. In this embodiment, the processing circuitry 802 may apply a first set of ordering rules to first level segments and apply a second set of ordering rules to second level segments in the first level segments. For example, decoder 706 may apply a first set of ordering rules to first level segments and apply a second set of ordering rules to second level segments in the first level segments when the at least one current picture has a plurality of segments in a plurality of levels. A segment may comprise one of a tile, a tile-group, a slice, a rectangular slice, or a subpicture of the bitstream. In some embodiments, the first level segments are subpictures and second level segments are slices.

Operations of an encoder 700 (implemented using the structure of the block diagram of FIG. 9) will now be discussed with reference to the flow charts of FIGS. 11 and 12 according to some embodiments of inventive concepts. As discussed above, modules may be stored in memory 904 of FIG. 9, and these modules may provide instructions so that when the instructions of a module are executed by processing circuitry 902, processing circuitry 902 performs respective operations of the flow chart.

Figure 11:
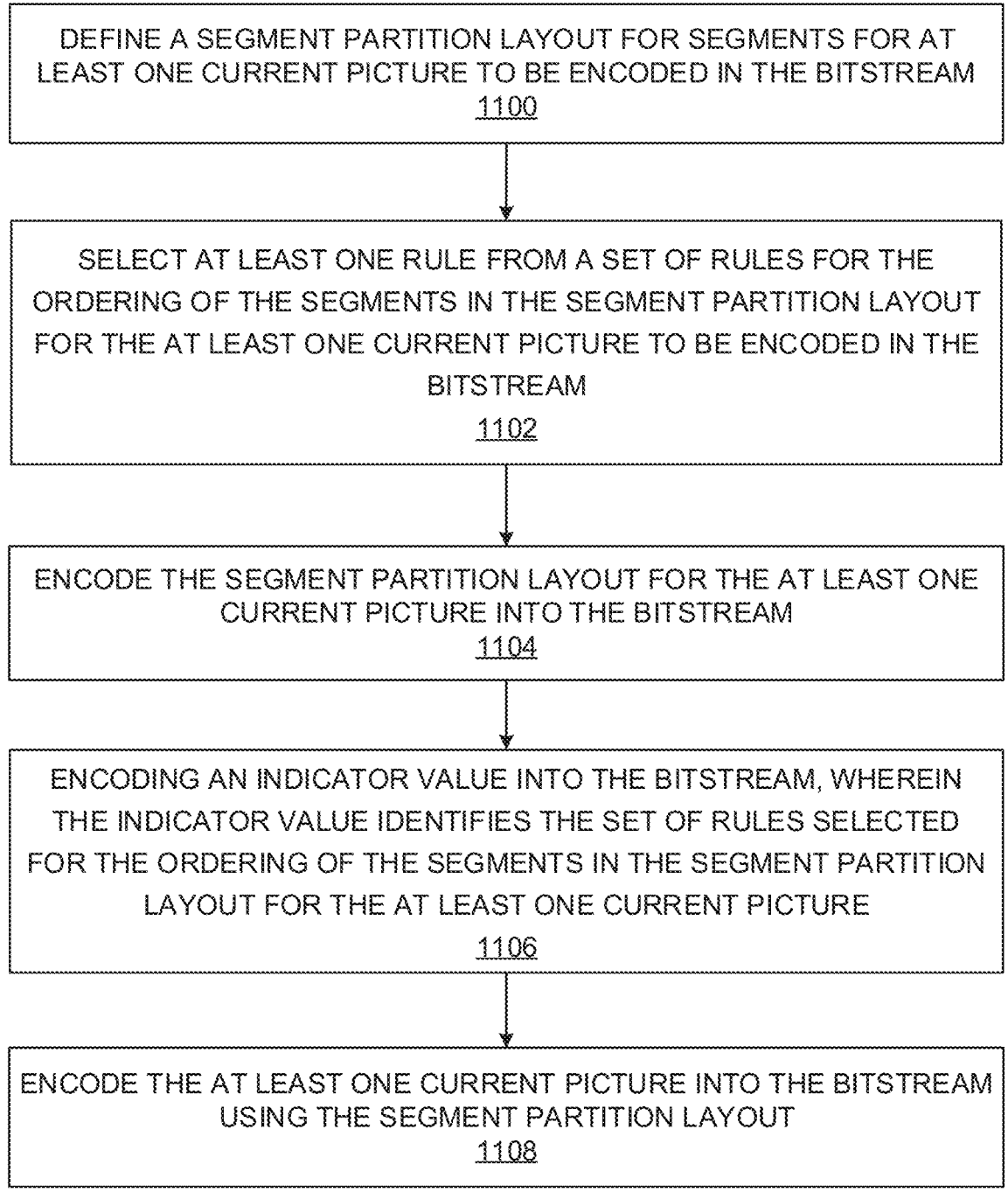
FIG. 11 is a flow chart illustrating operations of an encoder according to some embodiments of inventive concepts.
Figure 12:
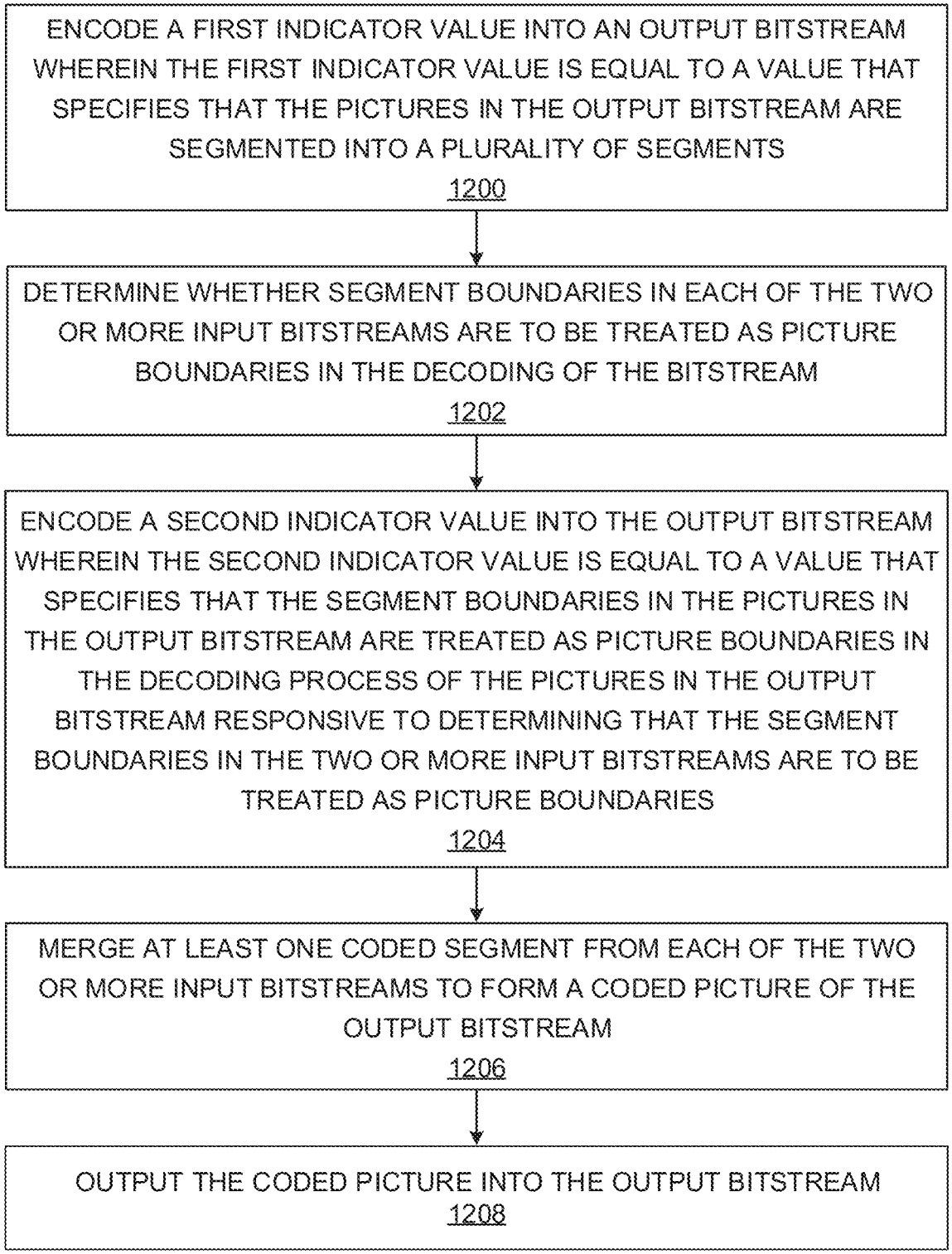
FIG. 12 is a flow chart illustrating further operations of the encoder according to some embodiments of inventive concepts.

FIG. 11 illustrates a method for encoding at least one current picture to a bitstream in accordance with embodiments of the inventive concepts. The method may be performed by encoder 700 which may transmit a bitstream to decoder 706 illustrated in FIG. 7. Returning to FIG. 11, the processing circuitry 902 may define in block 1100 a segment partition layout for segments for at least one current picture to be encoded in the bitstream. For example, encoder 700 may define a segment partition layout for segments for at least one current picture to be encoded in the bitstream. The processing circuitry 902 in block 1102 may select at least one rule from a set of rules for the ordering of the segments in the segment partition layout for the at least one current picture to be encoded in the bitstream as shown in FIG. 11. For example, encoder 700 may select at least one rule from a set of rules for the ordering of the segments in the segment partition layout for the at least one current picture to be encoded in the bitstream. In some embodiments, the plurality of rules comprises one or more of an availability rule, an arbitrary segment ordering, an ordering in an increasing order of a first coding tree unit address in each segment, an ordering rule based on the size or location of the segments in the segment layout, and a combination of two or more rules.

In block 1104, the processing circuitry 902 may encode the segment partition layout for the at least one current picture into the bitstream. Continuing the previous example, the encoder 700 may encode the segment partition layout for the at least one current picture into the bitstream. The processing circuitry 902 may encode a first value of a syntax element into the bitstream responsive to determining that arbitrary segment ordering in the segment partition layout is to be applied to all of the segments. For example, the encoder 700 may encode a first value of a syntax element into the bitstream responsive to determining that arbitrary segment ordering in the segment partition layout is to be applied to all of the segments.

When arbitrary segment ordering is to be applied, the coded segments are put in the bitstream in an order such that at least one segment does not have an entire left boundary and an entire top boundary consisting of picture boundaries or consisting of boundaries of previously decoded segments. The processing circuitry 902 may also encode a second value of the syntax element into the bitstream responsive to determining that each segment should have an entire left boundary and an entire top boundary consisting of picture boundaries or consisting of boundaries of previously decoded segments. For example, the encoder 700 may encode a second value of the syntax element into the bitstream responsive to determining that each segment should have an entire left boundary and an entire top boundary consisting of picture boundaries or consisting of boundaries of previously decoded segments.

The processing circuitry 902 may encode a first value of a syntax element into the bitstream responsive to determining that all segments in the bitstream follow an availability rule for segments. For example, encoder 700 may encode a first value of a syntax element into the bitstream responsive to determining that all segments in the bitstream follow an availability rule for segments. The processing circuitry 902 may encode a second value of the syntax element into the bitstream responsive to determining that subpictures in the bitstream do not follow the availability rule for the segments. Continuing the previous example, encoder 700 may encode a second value of the syntax element into the bitstream responsive to determining that subpictures in the bitstream do not follow the availability rule for the segments.

Returning to FIG. 11, in block 1106, the processing circuitry 902 may encode an indicator value into the bitstream, wherein the indicator value identifies the set of rules selected for the ordering of the segments in the segment partition layout for the at least one current picture. For example, encoder 700 may encode an indicator value into the bitstream, wherein the indicator value identifies the set of rules selected for the ordering of the segments in the segment partition layout for the at least one current picture. In block 1108, the processing circuitry 902 may encode the at least one current picture into the bitstream using the segment partition layout. Continuing the example, encoder 700 may encode the at least one current picture into the bitstream using the segment partition layout.

The processing circuitry 902 may encode a first indicator value into the bitstream wherein the first indicator value specifies that the at least one current picture is segmented into a plurality of segments responsive to a current picture is being segmented into a plurality of segments. For example, encoder 700 may encode a first indicator value into the bitstream wherein the first indicator value specifies that the at least one current picture is segmented into a plurality of segments responsive to a current picture is being segmented into a plurality of segments. The processing circuitry 902 may also encode a second indicator value into the bitstream wherein the second indicator value specifies that all segments in the at least one current picture are independent responsive to all segments in the picture being independent. Continuing the previous example, encoder 700 may encode a second indicator value into the bitstream wherein the second indicator value specifies that all segments in the at least one current picture are independent responsive to all segments in the picture being independent. In another embodiment, the processing circuitry 902 may encode a second indicator value into the bitstream wherein the second indicator value specifies that all segment boundaries in the at least one current picture are treated as picture boundaries in decoding of the at least one current picture responsive to all segment boundaries in the at least one current picture are treated as picture boundaries. In another example, encoder 706 may encode a second indicator value into the bitstream wherein the second indicator value specifies that all segment boundaries in the at least one current picture are treated as picture boundaries in decoding of the at least one current picture responsive to all segment boundaries in the at least one current picture are treated as picture boundaries.

The processing circuitry 902 may encode a syntax element specifying an arbitrary ordering to all segments of the picture responsive to applying the arbitrary ordering to all segments of the at least one current picture except a segment containing a first coding tree unit in the picture. For example, encoder 700 may encode a syntax element specifying an arbitrary ordering to all segments of the picture responsive to applying the arbitrary ordering to all segments of the at least one current picture except a segment containing a first coding tree unit in the picture. In some embodiments, the at least one current picture has a plurality of segments in a plurality of levels. In this embodiment, the processing circuitry 902 may apply a first set of ordering rules to first level segments and apply a second set of ordering rules to second level segments in the first level segments. For example, encoder 700 may apply a first set of ordering rules to first level segments and apply a second set of ordering rules to second level segments in the first level segments.

In some embodiments, the encoder may receive two or more input bitstreams. Turning to FIG. 12, in block 1200, processing circuitry 902 may encode a first indicator value into an output bitstream wherein the first indicator value is equal to a value that specifies that the pictures in the output bitstream are segmented into a plurality of segments. For example, encoder 700 may receive two or more input bitstreams. In this situation, encoder 700 may encode a first indicator value into an output bitstream wherein the first indicator value is equal to a value that specifies that the pictures in the output bitstream are segmented into a plurality of segments In block 1202, the processing circuitry 902 may determine whether segment boundaries in each of the two or more input bitstreams are to be treated as picture boundaries in the decoding of the bitstream. Continuing the previous example, encoder 700 may determine whether segment boundaries in each of the two or more input bitstreams are to be treated as picture boundaries in the decoding of the bitstream.

In block 1204, the processing circuitry 902 may encode a second indicator value into the output bitstream wherein the second indicator value is equal to a value that specifies that the segment boundaries in the pictures in the output bitstream are treated as picture boundaries in the decoding process of the pictures in the output bitstream responsive to determining that the segment boundaries in the two or more input bitstreams are to be treated as picture boundaries. Continuing the previous example, the encoder 700 may encode a second indicator value into the output bitstream wherein the second indicator value is equal to a value that specifies that the segment boundaries in the pictures in the output bitstream are treated as picture boundaries in the decoding process of the pictures in the output bitstream responsive to determining that the segment boundaries in the two or more input bitstreams are to be treated as picture boundaries.

In block 1206, the processing circuitry 902 may merge at least one coded segment from each of the two or more input bitstreams to form a coded picture of the output bitstream and outputting 1208 the coded picture into the output bitstream. Continuing the previous example, the encoder 700 may merge at least one coded segment from each of the two or more input bitstreams to form a coded picture of the output bitstream and output the coded picture into the output bitstream.

Example embodiments are discussed below.

1. A method for decoding at least one current picture from a bitstream, the method comprising:
   decoding (1000) an indicator value from the bitstream specifying at least one rule of a plurality of rules, the at least one rule applied to ordering of segments coded in the bitstream, wherein the segments are segments in a segment partition layout;
   decoding (1002) a set of syntax elements from the bitstream specifying a segment partition layout;
   deriving (1004) a segment partition layout based on the set of syntax elements; and
   decoding (1006) the at least one current picture in the bitstream using the segment partition layout, wherein the ordering of the segments complies with the at least one rule specified.

2. The method of Embodiment 1, wherein the plurality of rules comprises one or more of an availability rule, an arbitrary segment ordering, an ordering in an increasing order of a first coding tree unit address in each segment, an ordering rule based on the size or location of the segments in the segment layout, and a combination of two or more rules.

3. The method of any of Embodiments 1-2 wherein deriving a segment partition layout based on the set of syntax elements comprises deriving the segment partition layout based on the set of syntax elements and the at least one rule.

4. The method of any of Embodiments 1-3 wherein decoding the indicator value from the bitstream comprises decoding the indicator value from one or more syntax elements of the set of syntax elements.

5. The method of any of Embodiments 1-4 wherein decoding the indicator value from one or more syntax elements of the set of syntax elements comprises decoding the indicator value from one or more syntax elements in a parameter set.

6. The method of any of Embodiments 1-5 wherein the parameter set is a sequence parameter set, SPS, or a picture parameter set, PPS, or a video parameter set, VPS.

7. The method of any of Embodiments 1-6, wherein decoding the set of syntax elements comprises:
   decoding the indicator value from a syntax element of the set of syntax elements;
   responsive to the indicator value being a first value, determining that arbitrary segment ordering in the segment partition layout is applied to all segments of the at least one current picture;
   responsive to the value being a second value, each segment, when decoded, has an entire left boundary and an entire top boundary consisting of picture boundaries or consisting of boundaries of previously decoded segments.

8. The method of Embodiment 7 wherein responsive to the value being a first value, a decoding order of the segments includes that at least one segment does not have an entire left boundary and/or an entire top boundary consisting of picture boundaries or consisting of boundaries of previously decoded segments.

9. The method of any of Embodiments 1-8, wherein decoding the set of syntax elements comprises:
   decoding a value of a syntax element of the set of syntax elements;
   responsive to the value being a first value, determining that all segments in the bitstream follow an availability rule for segments;
   responsive to the value being a second value, determining that segments in the bitstream may not follow the availability rule for the segments.

10. The method of any of Embodiments 1-9 further comprising:
   decoding a first indicator value from the bitstream wherein the first indicator value specifies whether the at least one current picture is segmented into a plurality of segments; and
   decoding a second indicator value from the bitstream wherein the second indicator value specifies whether all segments in the at least one current picture are independent.

11. The method of any of Embodiments 1-9 further comprising:
   decoding a first indicator value from the bitstream wherein the first indicator value specifies whether the at least one current picture is segmented into a plurality of segments; and
   decoding a second indicator value from the bitstream wherein the second indicator value specifies whether all segment boundaries in the at least one current picture are treated as picture boundaries in decoding of the at least one current picture.

12. The methods of any of Embodiments 10-11 wherein the second indicator value and the indicator value are values of a same indicator.

13. The methods of any Embodiment 10-12 wherein the first indicator specifies that the current picture is segmented into a plurality of segments and the second indicator value specifies that all segments in the current picture are independent or the second indicator value specifies that all segment boundaries in the current picture are treated as picture boundaries in decoding of the current picture, wherein decoding the current picture comprises decoding each segment wherein no segment in the current picture is depending on any property of any other segment in the current picture.

14. The method of any of Embodiments 1-13 further comprising:
   decoding a syntax element of the set of syntax elements;
   responsive to the syntax element specifying an arbitrary ordering, applying the arbitrary ordering to all segments of the at least one current picture except a segment containing a first coding tree unit in the current picture.

15. The method of any of Embodiments 1-14 wherein the at least one current picture has a plurality of segments in a plurality of levels, the method further comprising:
   applying a first set of ordering rules to first level segments; and
   applying a second set of ordering rules to second level segments in the first level segments.

16. The method of any of Embodiments 1-15 where a segment is one of a tile, a tile-group, a slice, a rectangular slice, or a subpicture.

17. The method of any of Embodiments 15-16 wherein first level segments are subpictures and second level segments are slices.

18. A decoder for a communication network, the decoder comprising:
   a processor; and
   memory coupled with the processor, wherein the memory comprises instructions that
   when executed by the processor cause the processor to perform operations comprising:
      decoding (1000) an indicator value from a bitstream, the indicator value specifying at least one rule of a plurality of rules, the at least one rule applied to ordering of segments coded in the bitstream, wherein the segments are segments in a segment partition layout;
      decoding (1002) a set of syntax elements from the bitstream specifying a segment partition layout;
      deriving (1004) a segment partition layout based on the set of syntax elements; and
      decoding (1006) at least one current picture in the bitstream using the segment partition layout, wherein the ordering of the segments complies with the at least one rule specified.

19. The decoder of Embodiment 18, wherein the memory comprises further instructions that when executed by the processor cause the processor to perform operations according to any of Embodiments 2-17.

20. A computer program product comprising computer-executable instructions configured to, when the computer-executable instructions are executed on a processor comprised in a device, cause the device to perform operations comprising:
   decoding (1000) an indicator value from the bitstream specifying at least one rule of a plurality of rules, the at least one rule applied to ordering of segments coded in the bitstream, wherein the segments are segments in a segment partition layout;
   decoding (1002) a set of syntax elements from the bitstream specifying a segment partition layout;
   deriving (1004) a segment partition layout based on the set of syntax elements; and
   decoding (1006) the at least one current picture in the bitstream using the segment partition layout, wherein the ordering of the segments complies with the at least one rule specified.

21. The computer program product of Embodiment 20 comprising further computer-executable instructions configured to, when executed on a processor comprised in the device, cause a device to perform the method according to any one of Embodiments 2-17.

22. A computer program product comprising a computer-readable storage medium, the computer-readable storage medium having computer-executable instructions configured to, when the computer-executable instructions are executed on a processor comprised in a device, cause the device to perform operations comprising:
   decoding (1000) an indicator value from the bitstream specifying at least one rule of a plurality of rules, the at least one rule applied to ordering of segments coded in the bitstream, wherein the segments are segments in a segment partition layout;
   decoding (1002) a set of syntax elements from the bitstream specifying a segment partition layout;
   deriving (1004) a segment partition layout based on the set of syntax elements; and decoding (1006) the at least one current picture in the bitstream using the segment partition layout, wherein the ordering of the segments complies with the at least one rule specified.

23. The computer program product of Embodiment 22 having further computer-executable instructions configured to, when executed on a processor comprised in the device, cause the device to perform the method according to any one of Embodiments 2-17.

24. A method for encoding at least one current picture to a bitstream, the method comprising:
  defining (1100) a segment partition layout for segments for at least one current picture to be encoded in the bitstream;
  selecting (1102) at least one rule from a set of rules for the ordering of the segments in the segment partition layout for the at least one current picture to be encoded in the bitstream;
  encoding (1104) the segment partition layout for the at least one current picture into the bitstream;
  encoding (1106) an indicator value into the bitstream, wherein the indicator value identifies the set of rules selected for the ordering of the segments in the segment partition layout for the at least one current picture; and
  encoding (1108) the at least one current picture into the bitstream using the segment partition layout.

25. The method of Embodiment 24, wherein the plurality of rules comprises one or more of an availability rule, an arbitrary segment ordering, an ordering in an increasing order of a first coding tree unit address in each segment, an ordering rule based on the size or location of the segments in the segment layout, and a combination of two or more rules.

26. The method of any of Embodiments 24-25, wherein encoding the at least one current picture into the bitstream using the segment partition layout comprises:
  responsive to determining that arbitrary segment ordering in the segment partition layout is to be applied to all of the segments, encoding a first value of a syntax element into the bitstream; and
  responsive to determining that each segment should have an entire left boundary and an entire top boundary consisting of picture boundaries or consisting of boundaries of previously decoded segments, encoding a second value of the syntax element into the bitstream.

27. The method of Embodiment 26 wherein when arbitrary segment ordering is to be applied, the coded segments are put in the bitstream in an order such that at least one segment does not have an entire left boundary and/or an entire top boundary consisting of picture boundaries or consisting of boundaries of previously decoded segments.

28. The method of any of Embodiments 24-27, further comprising:
  responsive to determining that all segments in the bitstream follow an availability rule for segments, encoding a first value of a syntax element into the bitstream;
  responsive to determining that segments in the bitstream do not follow the availability rule for the segments, encoding a second value of the syntax element into the bitstream.

29. The method of any of Embodiments 24-28 further comprising:
  responsive to a current picture is being segmented into a plurality of segments, encoding a first indicator value into the bitstream wherein the first indicator value specifies that the at least one current picture is segmented into a plurality of segments; and
  responsive to all segments in the current picture being independent, encoding a second indicator value into the bitstream wherein the second indicator value specifies that all segments in the at least one current picture are independent.

30. The method of any of Embodiments 24-28 further comprising:
  responsive to a current picture is being segmented into a plurality of segments, encoding a first indicator value into the bitstream wherein the first indicator value specifies that the at least one current picture is segmented into a plurality of segments; and
  responsive to all segment boundaries in the at least one current picture are treated as picture boundaries, encoding a second indicator value into the bitstream wherein the second indicator value specifies that all segment boundaries in the at least one current picture are treated as picture boundaries in decoding of the at least one current picture.

31. The method of any of Embodiments 24-30 further comprising:
  responsive to applying the arbitrary ordering to all segments of the at least one current picture except a segment containing a first coding tree unit in the current picture, encoding a syntax element specifying an arbitrary ordering to all segments of the current picture.

32. The method of any of Embodiments 24-31 wherein the at least one current picture has a plurality of segments in a plurality of levels, the method further comprising:
  applying a first set of ordering rules to first level segments; and
  applying a second set of ordering rules to second level segments in the first level segments.

33. The method of any of Embodiments 24-32, wherein the encoder receives two or more input bitstreams, the method further comprising:
  encoding (1200) a first indicator value into an output bitstream wherein the first indicator value is equal to a value that specifies that the pictures in the output bitstream are segmented into a plurality of segments;
  determining (1202) whether segment boundaries in each of the two or more input bitstreams are to be treated as picture boundaries in the decoding of the bitstream;
  responsive to determining that the segment boundaries in the two or more input bitstreams are to be treated as picture boundaries, encoding (1204) a second indicator value into the output bitstream wherein the second indicator value is equal to a value that specifies that the segment boundaries in the pictures in the output bitstream are treated as picture boundaries in the decoding process of the pictures in the output bitstream;
  merging (1206) at least one coded segment from each of the two or more input bitstreams to form a coded picture of the output bitstream; and
  outputting (1208) the coded picture into the output bitstream.

34. The method of any of Embodiments 24-33 where a segment is one of a tile, a tile-group, a slice, a rectangular slice or a subpicture.

35. An encoder for a communication network, the encoder comprising:
  a processor; and
  memory coupled with the processor, wherein the memory comprises instructions that when executed by the processor cause the processor to perform operations comprising:

defining (1100) a segment partition layout for segments for at least one current picture to be encoded in the bitstream;

selecting (1102) at least one rule from a set of rules for the ordering of the segments in the segment partition layout for the at least one current picture to be encoded in the bitstream;

encoding (1104) the segment partition layout for the at least one current picture into the bitstream;

encoding (1106) an indicator value into the bitstream, wherein the indicator value identifies the set of rules selected for the ordering of the segments in the segment partition layout for the at least one current picture; and encoding (1108) the at least one current picture into the bitstream using the segment partition layout.

36. The encoder of Embodiment 35, wherein the memory comprises further instructions that when executed by the processor cause the processor to perform operations according to any of Embodiments 24-34.

37. A computer program product comprising computer-executable instructions configured to, when the computer-executable instructions are executed on a processor comprised in a device, cause the device to perform operations comprising:

defining (1100) a segment partition layout for segments for at least one current picture to be encoded in the bitstream;

selecting (1102) at least one rule from a set of rules for the ordering of the segments in the segment partition layout for the at least one current picture to be encoded in the bitstream;

encoding (1104) the segment partition layout for the at least one current picture into the bitstream;

encoding (1106) an indicator value into the bitstream, wherein the indicator value identifies the set of rules selected for the ordering of the segments in the segment partition layout for the at least one current picture; and encoding (1108) the at least one current picture into the bitstream using the segment partition layout.

38. The computer program product of Embodiment 37 comprising further computer-executable instructions configured to, when the computer-executable instructions are executed on a processor comprised in the device, cause a device to perform the method according to any one of Embodiments 24-34.

39. A computer program product comprising a computer-readable storage medium, the computer-readable storage medium having computer-executable instructions configured to, when the computer-executable instructions are executed on a processor comprised in a device, cause the device to perform operations comprising:

defining (1100) a segment partition layout for segments for at least one current picture to be encoded in the bitstream;

selecting (1102) at least one rule from a set of rules for the ordering of the segments in the segment partition layout for the at least one current picture to be encoded in the bitstream;

encoding (1104) the segment partition layout for the at least one current picture into the bitstream;

encoding (1106) an indicator value into the bitstream, wherein the indicator value identifies the set of rules selected for the ordering of the segments in the segment partition layout for the at least one current picture; and encoding (1108) the at least one current picture into the bitstream using the segment partition layout.

40. The computer program product of Embodiment 39 having further computer-executable instructions configured to, when the further computer-executable instructions are executed on a processor comprised in the device, cause a device to perform the method according to any one of Embodiments 24-34.

Explanations are provided below for various abbreviations/acronyms used in the present disclosure.

| Abbreviation | Explanation |
| --- | --- |
| ALF | Adaptive Loop Filter |
| APS | Adaptive Parameter Set |
| CLVS | Coded Layer Video Sequence |
| CVS | Coded Video Stream |
| CVSS | CVS Start |
| CU | Coding Unit |
| CTU | Coding Tree Unit |
| DPS | Decoding Parameter Set |
| GDR | Gradual Decoding Refresh |
| HEVC | High-Efficiency Video Coding |
| IRAP | Intra Random Access Point |
| LMCS | Luma Mapping and Chroma Scaling |
| MPEG | Motion Picture Experts Group |
| NAL | Network Abstraction Layer |
| PPS | Picture Parameter Set |
| RPL | Reference Picture List |
| SEI | Supplemental Enhancement layer |
| SPS | Sequence Parameter Set |
| VCL | Video Coding Layer |
| VPS | Video Parameter Set |
| WC | Versatile Video Coding |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 13 illustrates a virtualization environment in accordance with some embodiments.

FIG. 13 is a schematic block diagram illustrating a virtualization environment 1300 in which functions implemented by some embodiments of the encoder and/or decoder may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions of the encoder and/or decoder described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300 comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340 comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 13, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 13.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signalling can be effected with the use of control system 13230 which may alternatively be used for communication between the hardware nodes 1330 and radio units 13200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method for decoding at least one current picture from a bitstream, the method comprising:
   decoding an indicator value from the bitstream specifying at least one rule of a plurality of rules, the at least one rule applied to ordering of segments coded in the bitstream and provides a plurality of allowed segment orders for decoding the at least one current picture from the bitstream, wherein the segments are segments in a segment partition layout;
   decoding a set of syntax elements from the bitstream specifying a segment partition layout;
   deriving a segment partition layout based on the set of syntax elements; and
   decoding the at least one current picture in the bitstream using the segment partition layout, wherein the ordering of the segments corresponds to one of the plurality of segment orders allowed by the at least one rule specified.

2. The method of claim 1, wherein the plurality of rules comprises one or more of an availability rule, an arbitrary segment ordering, an ordering in an increasing order of a first coding tree unit address in each segment, an ordering rule based on a size or location of the segments in the segment layout, and a combination of two or more rules.

3. The method of claim 2, wherein the plurality of rules comprises the ordering, in the increasing order, of the first coding tree unit address in each segment.

4. The method of claim 2, wherein the plurality of rules comprises the availability rule.

5. The method of claim 1, wherein deriving a segment partition layout based on the set of syntax elements comprises deriving the segment partition layout based on the set of syntax elements and the at least one rule.

6. The method of claim 1, wherein decoding the indicator value from the bitstream comprises decoding the indicator value from one or more syntax elements of the set of syntax elements.

7. The method of claim 6, wherein decoding the indicator value from one or more syntax elements of the set of syntax elements comprises decoding the indicator value from one or more syntax elements in a parameter set.

8. The method of claim 7, wherein the parameter set is a sequence parameter set, SPS, or a picture parameter set, PPS, or a video parameter set, VPS.

9. The method of claim 8, wherein the parameter set is an SPS.

10. The method of claim 1, further comprising:
    decoding a first indicator value from the bitstream wherein the first indicator value specifies whether the at least one current picture is segmented into a plurality of segments; and
    decoding a second indicator value from the bitstream wherein the second indicator value specifies whether all segments in the at least one current picture are independent.

11. The method of claim 1, further comprising:
    decoding a first indicator value from the bitstream wherein the first indicator value specifies whether the at least one current picture is segmented into a plurality of segments; and
    decoding a second indicator value from the bitstream wherein the second indicator value specifies whether all segment boundaries in the at least one current picture are treated as picture boundaries in decoding of the at least one current picture.

12. The method of claim 10, wherein the first indicator specifies that the current picture is segmented into a plurality of segments and the second indicator value specifies that all segments in the current picture are independent, wherein decoding the current picture comprises decoding each segment wherein no segment in the current picture is depending on any property of any other segment in the current picture.

13. The method of claim 1, wherein the at least one current picture has a plurality of segments in a plurality of levels, the method further comprising:
    applying a first set of ordering rules to first level segments; and
    applying a second set of ordering rules to second level segments in the first level segments.

14. The method of claim 1, where a segment is one of a tile, a tile-group, a slice, a rectangular slice, or a subpicture.

15. The method of claim 1, wherein a segment is a subpicture.

16. A decoder for a communication network, the decoder comprising:
    a processor; and
    memory coupled with the processor, wherein the memory comprises instructions that when executed by the processor cause the processor to perform operations comprising:
       decoding an indicator value from a bitstream, the indicator value specifying at least one rule of a plurality of rules, the at least one rule applied to ordering of segments coded in the bitstream and provides a plurality of allowed segment orders for decoding at least one current picture from the bitstream, wherein the segments are segments in a segment partition layout;
       decoding a set of syntax elements from the bitstream specifying a segment partition layout;
       deriving a segment partition layout based on the set of syntax elements; and
       decoding the at least one current picture in the bitstream using the segment partition layout, wherein the ordering of the segments corresponds to one of the plurality of segment orders allowed by the at least one rule specified.

17. The decoder of claim 16, wherein the plurality of rules comprises one or more of an availability rule, an arbitrary segment ordering, an ordering in an increasing order of a first coding tree unit address in each segment, an ordering rule based on a size or location of the segments in the segment layout, and a combination of two or more rules.

18. The decoder of claim 16, wherein in decoding the indicator value from the bitstream, the memory comprises instructions that when executed by the processor cause the processor to perform operations comprising decoding the indicator value from one or more syntax elements of the set of syntax elements.

19. The decoder of claim 16, wherein the at least one current picture has a plurality of segments in a plurality of levels, wherein the memory comprises further instructions that when executed by the processor cause the processor to perform further operations comprising:
    applying a first set of ordering rules to first level segments; and
    applying a second set of ordering rules to second level segments in the first level segments.

20. A method for encoding at least one current picture to a bitstream, the method comprising:
    defining a segment partition layout for segments for at least one current picture to be encoded in the bitstream;

selecting at least one rule from a set of rules for an ordering of the segments in the segment partition layout for the at least one current picture to be encoded in the bitstream;

encoding the segment partition layout for the at least one current picture into the bitstream;

encoding an indicator value into the bitstream, wherein the indicator value identifies the at least one rule selected for the ordering of the segments in the segment partition layout for the at least one current picture, wherein the at least one rule provides a plurality of allowed segment orders for decoding the at least one current picture from the bitstream; and encoding the at least one current picture into the bitstream using the segment partition layout.

21. The method of claim 20, wherein the set of rules comprises one or more of an availability rule, an arbitrary segment ordering, an ordering in an increasing order of a first coding tree unit address in each segment, an ordering rule based on a size or location of the segments in the segment layout, and a combination of two or more rules.

22. The method of claim 20, further comprising:

responsive to determining that all segments in the bitstream follow an availability rule for segments, encoding a first value of a syntax element into the bitstream; and responsive to determining that segments in the bitstream do not follow the availability rule for the segments, encoding a second value of the syntax element into the bitstream.

23. An encoder for encoding pictures for communication in a bitstream, the encoder comprising:

a processor; and memory coupled with the processor, wherein the memory comprises instructions that when executed by the processor cause the processor to perform operations comprising:

defining a segment partition layout for segments for at least one current picture to be encoded in the bitstream;

selecting at least one rule from a set of rules for an ordering of the segments in the segment partition layout for the at least one current picture to be encoded in the bitstream;

encoding the segment partition layout for the at least one current picture into the bitstream;

encoding an indicator value into the bitstream, wherein the indicator value identifies the at least one rule selected for the ordering of the segments in the segment partition layout for the at least one current picture, wherein the at least one rule provides a plurality of allowed segment orders for decoding the at least one current picture from the bitstream; and encoding the at least one current picture into the bitstream using the segment partition layout.

24. The encoder of claim 23, wherein the set of rules comprises one or more of an availability rule, an arbitrary segment ordering, an ordering in an increasing order of a first coding tree unit address in each segment, an ordering rule based on a size or location of the segments in the segment layout, and a combination of two or more rules.

25. The method of claim 11, wherein the first indicator specifies that the current picture is segmented into a plurality of segments and the second indicator value specifies that all segment boundaries in the current picture are treated as picture boundaries in decoding of the current picture.

\* \* \* \* \*